(12) United States Patent
Byun

(10) Patent No.: US 10,146,474 B2
(45) Date of Patent: Dec. 4, 2018

(54) MEMORY SYSTEM AND OPERATING METHOD OF MEMORY SYSTEM

(71) Applicant: SK hynix Inc., Gyeonggi-do (KR)

(72) Inventor: Eu-Joon Byun, Gyeonggi-do (KR)

(73) Assignee: SK Hynix Inc., Gyeonggi-do (KR)

( * ) Notice: Subject to any disclaimer, the term of this patent is extended or adjusted under 35 U.S.C. 154(b) by 1 day.

(21) Appl. No.: 15/152,267

(22) Filed: May 11, 2016

(65) Prior Publication Data

US 2017/0185348 A1 Jun. 29, 2017

(30) Foreign Application Priority Data

Dec. 23, 2015 (KR) ........................ 10-2015-0184826

(51) Int. Cl.
*G06F 3/06* (2006.01)
*G06F 12/00* (2006.01)

(52) U.S. Cl.
CPC ............ *G06F 3/0656* (2013.01); *G06F 3/061* (2013.01); *G06F 3/0679* (2013.01); *G06F 12/00* (2013.01)

(58) Field of Classification Search
CPC ....... G06F 3/0656; G06F 3/061; G06F 3/0679
USPC ................................................. 711/103, 156
See application file for complete search history.

(56) References Cited

U.S. PATENT DOCUMENTS

| 6,205,478 | B1 * | 3/2001 | Sugano | G06Q 30/06 709/223 |
| 8,326,899 | B2 * | 12/2012 | Harvey | H04L 61/15 707/828 |
| 9,164,677 | B2 * | 10/2015 | Shim | G06F 3/061 |
| 2007/0112877 | A1 * | 5/2007 | Harvey | H04L 29/12047 |
| 2008/0209110 | A1 * | 8/2008 | Pyeon | G06F 13/4243 711/103 |
| 2011/0252069 | A1 * | 10/2011 | Brodie | G06F 17/30038 707/799 |
| 2012/0127807 | A1 * | 5/2012 | Pio | G11C 5/147 365/189.09 |
| 2013/0067151 | A1 * | 3/2013 | Lasser | G06F 12/0246 711/103 |
| 2014/0244901 | A1 * | 8/2014 | Panda | G06F 12/0246 711/103 |
| 2015/0121165 | A1 * | 4/2015 | Lam | G06F 12/06 714/758 |
| 2015/0178149 | A1 * | 6/2015 | Cai | G06F 11/108 714/766 |
| 2016/0378454 | A1 * | 12/2016 | Nekrestyanov | G06F 8/65 717/170 |
| 2017/0039141 | A1 * | 2/2017 | Yeh | G06F 12/1009 |

FOREIGN PATENT DOCUMENTS

| KR | 1020090098275 | 9/2009 |
| KR | 1020120074707 | 7/2012 |
| KR | 101301840 | 8/2013 |
| KR | 101515525 | 4/2015 |

* cited by examiner

*Primary Examiner* — Pierre Miche Bataille
(74) *Attorney, Agent, or Firm* — IP & T Group LLP

(57) ABSTRACT

A memory system may include a memory device including a plurality of memory blocks, and a controller including a memory the controller being suitable for performing a command operation corresponding to a command received from a host, storing user data and metadata in the memory, and storing the user data and the metadata in at least one memory block among the memory blocks based on a command parameter included in the command.

12 Claims, 13 Drawing Sheets

MEMORY SYSTEM AND OPERATING METHOD OF MEMORY SYSTEM

CROSS-REFERENCE TO RELATED APPLICATION

The present application claims priority of Korean Patent Application No. 10-2015-0184826, filed on Dec. 23, 2015, which is incorporated herein by reference in its entirety.

BACKGROUND

1. Field

Exemplary embodiments of the present invention relate to a memory system, and more particularly, to a semiconductor memory system for processing data into a memory device and an operating method thereof.

2. Description of the Related Art

The computer environment paradigm has shifted to ubiquitous computing, systems that may be used anytime and anywhere. As a result, use of portable electronic devices, such as mobile phones, digital cameras, and notebook computers continues to increase rapidly. These portable electronic devices generally use a memory system having one or more semiconductor memory devices also referred to as data storage devices. The data storage device may be used as the main memory device or an auxiliary memory device of a portable electronic device.

Data storage devices employing semiconductor memory devices provide excellent stability, durability, high information access speed, and low power consumption, since they have no moving parts. Examples of data storage devices include universal serial bus (USB) memory devices, memory cards having various interfaces, and solid state drives (SSD).

SUMMARY

Various embodiments are directed to a memory system capable of processing data rapidly and stably by increasing the use efficiency of a memory device and to an operating method thereof.

In an embodiment, a memory system, may include: a memory device including a plurality of memory blocks; and a controller including a memory, the controller being suitable for performing a command operation corresponding to a command received from a host, storing user data and metadata in the memory, and storing the user data and the metadata in at least one memory block among the memory blocks based on a command parameter included in the command.

The memory may include: a first buffer suitable for storing data segments of the user data; and a second buffer suitable for storing meta segments of the metadata.

The controller may be suitable for: determining an update parameter based on the command parameter, and storing the data segments stored in the first buffer in the at least one memory block based on the update parameter.

The controller may be suitable for: updating the meta segments in response to the storage of the data segments, and storing the metadata in the memory by buffering the updated meta segments in the memory based on the update parameter.

The controller may be suitable for storing the data segments stored in the first buffer in the at least one memory block while buffering the updated meta segments in the memory.

The meta segments may include map segments of a first map data and a second map data, the controller may be suitable for updating and buffering the map segments of the first map data based on the update parameter, and the controller may be suitable for updating and buffering the map segments of the second map data in response to the storage of the data segments.

The controller may be suitable for storing the user data and the metadata stored in the memory in a super memory block including at least two memory blocks among the plurality of the memory blocks through one shot program.

The super memory block may include a first memory block, and a second memory block among the plurality of memory blocks, the memory device may include a plurality of memory dies each of the plurality of memory dies including a plurality of planes, each of the plurality of planes including the plurality of memory blocks, and the first memory block may include a specific memory block of memory blocks included in a first plane of a first memory die of the plurality of memory dies.

The second memory block may be one of: a specific memory block which belongs to the memory blocks included in the first plane of the first memory die of the memory dies and which is different from the specific memory block of the memory blocks included in the first plane of the first memory die of the plurality of memory dies; a specific memory block of memory blocks included in a second plane of the first memory die of the memory dies; and a specific memory block of memory blocks included in a plurality of planes of a second memory die of the memory dies.

The command parameter may include one of a processing pattern of the user data, and a data type of the user data.

In an embodiment, an operating method of a memory system, may include: receiving a command from a host with respect to a memory device including a plurality of memory blocks; performing a command operation corresponding to the command between a controller of the memory device and the plurality of memory blocks; storing user data and metadata in a memory of the controller; and storing the user data and the metadata in at least one memory block among the memory blocks based on a command parameter included in the command.

The storing of the user data and the metadata in the memory of the controller may include: storing data segments of the user data in a first buffer included in the memory; and storing meta segments of the metadata in a second buffer included in the memory.

The operating method may further include determining an update parameter based on the command parameter, and the storing of the data segments in the memory blocks may include storing the data segments stored in the first buffer in the at least one memory block based on the update parameter.

The storing of the metadata in the memory may include: updating the meta segments in response to the storage of the data segments, and buffering the updated meta segments in the memory based on the update parameter.

The storing of the data segments stored in the first buffer in the at least one memory block may be performed while buffering the updated meta segments in the memory.

The meta segments may include map segments of a first map data and a second map data, the updating and buffering of the map segments of the first map data may be performed based on the information, and the updating and buffering of the map segments of the second map data may be performed in responsive to the storage of the data segments.

The storing of the user data and the metadata in the memory blocks may include storing the user data and the metadata stored in the memory in a super memory block including at least two memory blocks among the plurality of the memory blocks through one shot program.

the super memory block may include a first memory block and second memory block among the plurality of memory blocks, the memory device may include a plurality of memory dies, each of the plurality of memory dies including a plurality of planes, each of the plurality of planes including the plurality of memory blocks, and the first memory block may include a specific memory block of memory blocks included in a first plane of a first memory die of the plurality of memory dies.

the second memory block may include one of: a specific memory block which belongs to the memory blocks included in the first plane of the first memory die of the memory dies and which is different from the specific memory block of the memory blocks included in the first plane of the first memory die of the plurality of memory dies, a specific memory block of memory blocks included in a second plane of the first memory die of the memory dies; and a specific memory block of memory blocks included in a plurality of planes of a second memory die of the memory dies.

The information may include one of a processing pattern of the user data, and a data type of the user data.

DETAILED DESCRIPTION

Figure 1:
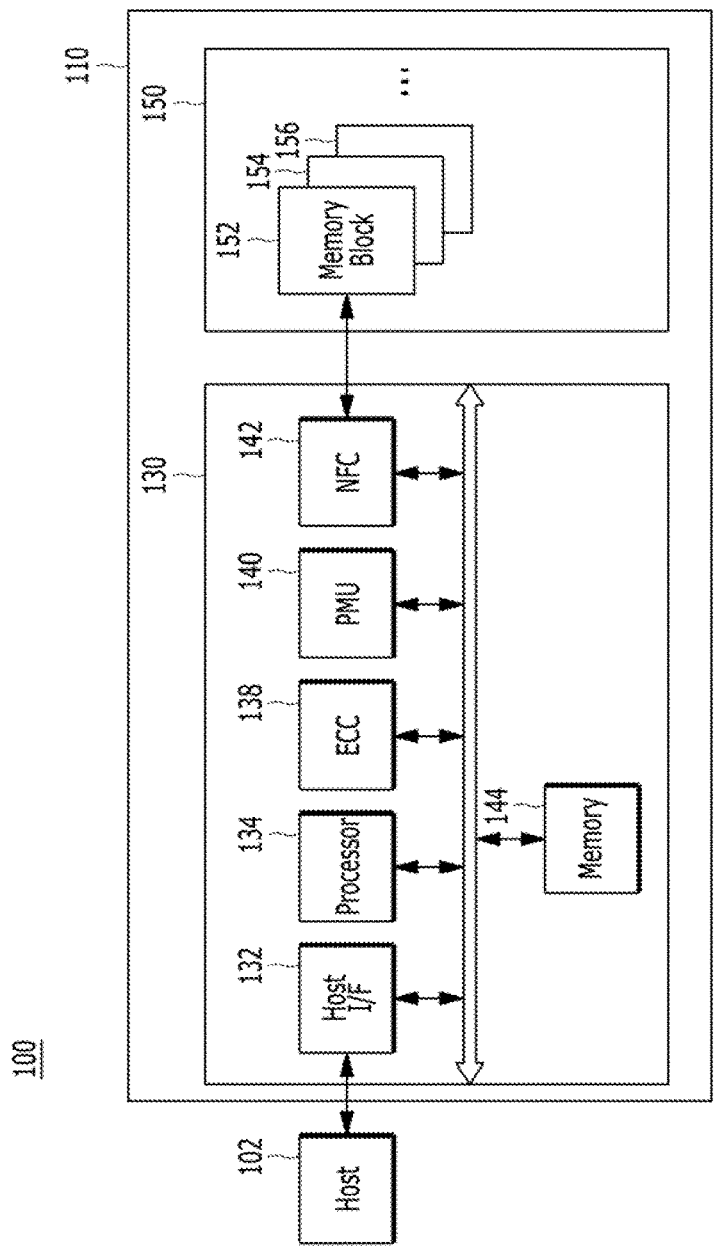
FIG. 1 is a diagram illustrating a data processing system including a memory system, according to an embodiment of the present invention.

Various embodiments will be described below in more detail with reference to the accompanying drawings. The present invention may, however, be embodied in different forms and should not be construed as being limited to the embodiments set forth herein. Rather, these embodiments are provided so that this disclosure is thorough and complete. Throughout the disclosure, like reference numerals refer to like parts throughout the various figures and embodiments of the present invention.

The drawings are not necessarily to scale and, in some instances, proportions may have been exaggerated in order to clearly illustrate features of the embodiments. Moreover, it is noted, that when an element is referred to as being connected or coupled to another element, it should be understood that the former may be directly connected or coupled to the latter, or electrically connected or coupled to the latter via an intervening element therebetween.

The terminology used herein is for the purpose of describing particular embodiments only and is not Intended to be limiting of the present invention. As used herein, singular forms are intended to include the plural forms as well, unless the context clearly indicates otherwise. It will be further understood that the terms "comprises", "comprising" "includes", and "including" when used in this specification, specify the presence of the stated elements and do not preclude the presence or addition of one or more other elements. As used herein, the term "and/or" includes any and all combinations of one or more of the associated listed items.

Unless otherwise defined, all terms including technical and scientific terms used herein have the same meaning as commonly understood by one of ordinary skill in the art to which the present invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

In the following description numerous specific details are set forth in order to provide a thorough understanding of the present invention. The present invention may be practiced without some or al of these specific details. In other instances, well-known process structures and/or processes have not been described for not unnecessarily obscuring the present invention.

It is also noted, that in some instances as would be apparent to those skilled in the relevant art, a feature or element described in connection with one embodiment may be used singly or in combination with other features or elements of another embodiment, unless otherwise specifically indicated.

Hereinafter, the various embodiments of the present invention will be described with reference to the attached drawings.

Referring now to FIG. 1, a data processing system 100 is provided, according to an embodiment of the present invention. The data processing system 100 may include a host 102 and a memory system 110.

The host 102 may include any suitable electronic device. For example, the host 102 may include a portable electronic device such as a mobile phone an MP3 player, a laptop computer and the like. The host may include a non-portable electronic device such as a desktop computer, a game player a TV, a projector and the like.

The memory system 110 may store data to be accessed by the host 102 in response to a request from the host 102. The memory system 110 may be used as a main memory system or an auxiliary memory system of the host 102. The memory system 110 may be implemented to be coupled electrically with the host 102, according to a protocol of a host interface. One or more semiconductor memory devices may be used. Volatile or non-volatile memory devices may be used. For example, the memory system 110 may be implemented with a solid state drive (SSD), a multimedia card (MMC) an embedded MMC (eMMC) a reduced size MMC (RS-MMC) and a micro-MMC, a secure digital (SD) card, a mini-SD and a micro-SD, a universal serial bus (USB) storage device, a universal flash storage (UFS) device a compact flash (CF) card, a smart media card, a memory stick, and the like.

The storage devices for the memory system 110 may be implemented with a volatile memory device, such as a dynamic random access memory (DRAM), a static random access memory (SRAM) and the like. Alternatively, the storage devices for the memory system 110 may be implemented a nonvolatile memory device such as a read only memory (ROM) a mask ROM (MROM) a programmable ROM (PROM), an erasable programmable ROM (EPROM), an electrically erasable programmable ROM (EEPROM), a ferroelectric random access memory (FRAM), a phase change RAM (PRAM) a magnetoresistive RAM (MRAM), a resistive RAM (RRAM) and the like.

The memory system 110 may include a memory device 150 for storing data and a controller 130 for controlling storage of data in the memory device 150. The stored data in the memory device 150 may be accessed by the host 102.

The controller 130 and the memory device 150 may be integrated into a single semiconductor device. For instance, the controller 130 and the memory device 150 may be integrated into a semiconductor device configured as a solid state drive (SSD). Configuring the memory system 110 as a SSD, may generally allow a significant increase in an operation speed, of the host 102.

The controller 130 and the memory device 150 may be integrated into a semiconductor device configured as a memory card, such as a Personal Computer Memory Card International Association (PCMCIA) card, a compact flash (CF) card, a smart media (SM) card (SMC), a memory stick, a multimedia card (MMC), an RS-MMC and a micro-MMC, a secure digital (SD card, a mini-SD, a micro-SD and an SDHC, a universal flash storage (UFS) device and the like.

Also, for example, the memory system 110 may be or comprise a computer, an ultra-mobile PC (UMPC), a workstation, a net-book, a personal digital assistant (PDA), a portable computer, a web tablet, a tablet computer, a wireless phone, a mobile phone, a smart phone, an e-book, a portable multimedia player (PMP), a portable game player, a navigation device, a black box, a digital camera, a digital multimedia broadcasting (DMB) player, a three-dimensional (3D) television, a smart television, a digital audio recorder, a digital audio player, a digital picture recorder, a digital picture player, a digital video recorder, a digital, video player, a storage configuring a data center, a device capable of transmitting and receiving information under a wireless environment, one of various electronic devices configuring a home network, one of various electronic devices configuring a computer network, one of various electronic devices configuring a telematics network, an RFID device, one of various component elements configuring a computing system and the like.

The memory device 150 may store data provided from the host 102. During a read operation, the memory device 150 may provide the stored data to the host 102. One or more memory devices 150 may be employed. The one or more memory devices 150 may be substantially identical. The one or more memory devices may be different memory devices. The memory device 150 may include one or more memory blocks 152, 154 and 156. Each of the memory blocks 152, 154 and 156 may include a plurality of pages. Each of the pages may include a plurality of memory cells coupled electrically to a plurality of word lines (WL). The memory device 150 may be a nonvolatile memory device capable of retaining stored data even when a power supply is interrupted or turned off. According to an embodiment, the memory device may be a flash memory. The memory device may be a flash memory device having a three-dimensional (3D) stack structure. Examples of a non-volatile memory device 150 having a three-dimensional (3D) stack structure are described later herein with reference to FIGS. 2 to 11.

The controller 130 may control the overall operation of the memory device 150, such as, read, write, program and/or erase operations. Generally, the controller 130 may control the memory device 150 in response to a request from the host 102. For example, the controller 130 may provide data read from the memory device 150, to the host 102 in response to a read request from the host 102. Or, also as an example, the controller may store data provided from the host 102 into the memory device 150 in response to a write request.

Any suitable controller may be used. For example, the controller 130 may include a host interface unit 132, a processor 134, an error correction code (ECC) unit 138, a power management unit (PMU) 140, a NAND flash controller (NFC) 142, and a memory 144.

The host interface unit 132 may process commands and/or data provided from the host 102. The host interface unit 1 may communicate with the host 102 through at least one of various interface protocols, such as a universal serial bus (USB), a multimedia card (MMC), a peripheral component interconnect-express (PCI-E), a serial attached SCSI (SAS), a serial advanced technology attachment (SATA), a parallel advanced technology attachment (PATA), a small computer system interface (SCSI), an enhanced small disk interface (ESDI), integrated drive electronics (IDE) and the like. The host interface unit 132 may include any suitable circuits, systems or devices suitable for communicating with the host 102 and the other components of the controller 30 as may be needed.

The ECC unit 138 may detect and correct errors of the data read from the memory device 150 during a read operation. Various detection and correction techniques may be employed. For example, if the number of the error bits detected by the ECC unit 138 is greater than or equal to a threshold number of correctable error bits, the ECC unit 138 may not correct the error bits and output an error correction fail signal indicating failure in correcting the error bits.

The ECC unit 138 may perform an error correction operation based on any suitable error correction scheme. For example, the ECC unit 138 may perform an error correction operation based on a coded modulation scheme, such as, for example a low density parity check (LDPC) code, a Bose-Chaudhuri-Hocquenghem (BCH) code, a turbo code, a Reed-Solomon (RS) code, a convolution code a recursive systematic code (RSC), a trellis-coded modulation (TCM), a Block coded modulation (BCM), and the like. The ECC unit 138 may include any suitable circuits, systems or devices required for an error detection and correction operation.

The PMU 140 may provide and manage electric power for the controller 130. For example, the PMU 140 may provide and manage electric power for the various components of the controller 130 as may be needed.

The NFC 142 may serve as a memory interface between the controller 130 and the memory device 150 to allow the controller 130 to control the memory device 150 in response to a request from the host 102. For example, the NFC 142 may generate control signals for the memory device 150. The NFC may process data under the control of the processor 134, for example, when the memory device 150 is a flash memory especially a NAND flash memory.

The memory 144 may serve as a working memory of the memory system 110 and the controller 130, and store data for driving the memory system 110 and the controller 130. For example, when the controller 130 controls the operations of the memory device 150, the memory 144 may store data used by the controller 130 and the memory device 150 for such operations as read, write, program and erase operations.

The memory 44 may be or comprise a volatile memory. For example, the memory 144 may be or comprise a static random access memory (SRAM) or a dynamic random access memory (DRAM). As described above the memory 144 may store data used by the host 102 and the memory device 150 for read and/or write operations. The memory 144 may be or comprise a program memory, a data memory, a write buffer, a read buffer, a map buffer, and the like.

The processor 134 may control the general operations of the memory system 110. For example, the processor 134 may control a write operation for the memory device 150, in response to a write request from the host 102. Also, for example, the processor 134 may control a read operation for the memory device 150, in response to a read request from the host 102. The processor 134 may drive a firmware also referred to as a flash translation layer (FTL), for controlling the general operations of the memory system 110. The processor 134 may be implemented with a microprocessor, a central processing unit (CPU) and the like. Any suitable processor may be used.

For example, a management unit (not shown) may be included in the processor 134 for performing bad block management of the memory device 150. Accordingly, the management unit may find bad memory blocks included in the memory device 150, i.e., memory blocks which are in an unsatisfactory condition for further use, and perform a bad block management operation the bad memory blocks. For example, when a flash memory, such as a NAND flash memory is employed as the memory device 150, a program failure may occur during a write operation due to inherent characteristics of a NAND logic function. During a bad block management the data of the program-failed memory blocks (e.g., the bad memory blocks) may be programmed into a new memory block. The bad blocks due to a program fail may seriously deteriorate the utilization efficiency of a memory device, especially one having a 3D stack structure and thus negatively affect the reliability of the memory system 110.

Figure 2:
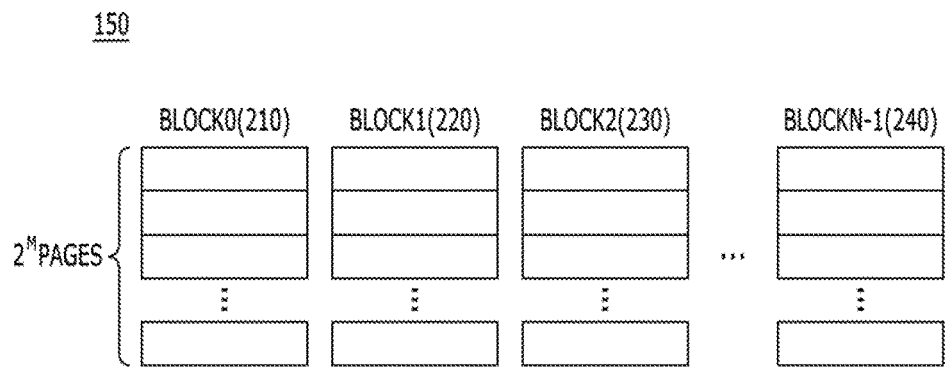
FIG. 2 is a diagram illustrating a memory device, according to an embodiment of the present invention.

Referring to FIG. 2 the memory device 150 may include a plurality of memory blocks, for example, zeroth to $(N-1)^{th}$ blocks 210 to 240, where N is a positive integer. Each of the plurality of memory blocks 210 to 240 may include a plurality of pages, for example, $2^M$ number of pages ($2^M$ PAGES), where M is a positive integer. Each of the plurality of pages may include a plurality of memory cells to which a plurality of word lines may be coupled electrically. It is noted that any number of suitable blocks and pages per block may be employed.

The memory blocks may be single level cell (SLC) memory blocks and/or multi-level cell (MLC) memory blocks, according to the number of bits which may be stored or expressed in each memory cell. An SLC memory block may include a plurality of pages which are implemented with memory cells each of which is capable of storing 1-bit data. An MLC memory block may include a plurality of pages which are implemented with memory cells each of which is capable of storing multi-bit data, for example, two or more-bit data. A MLC memory block including a plurality of pages which are implemented with memory cells each which is capable of storing 3-bit data may be employed and will be referred to as a triple level cell (TLC) memory block.

Each of the plurality of memory blocks 210 to 240 may store data provided from the host device 102 during a write operation, and may provide stored data to the host 102 during a read operation.

Figure 3:
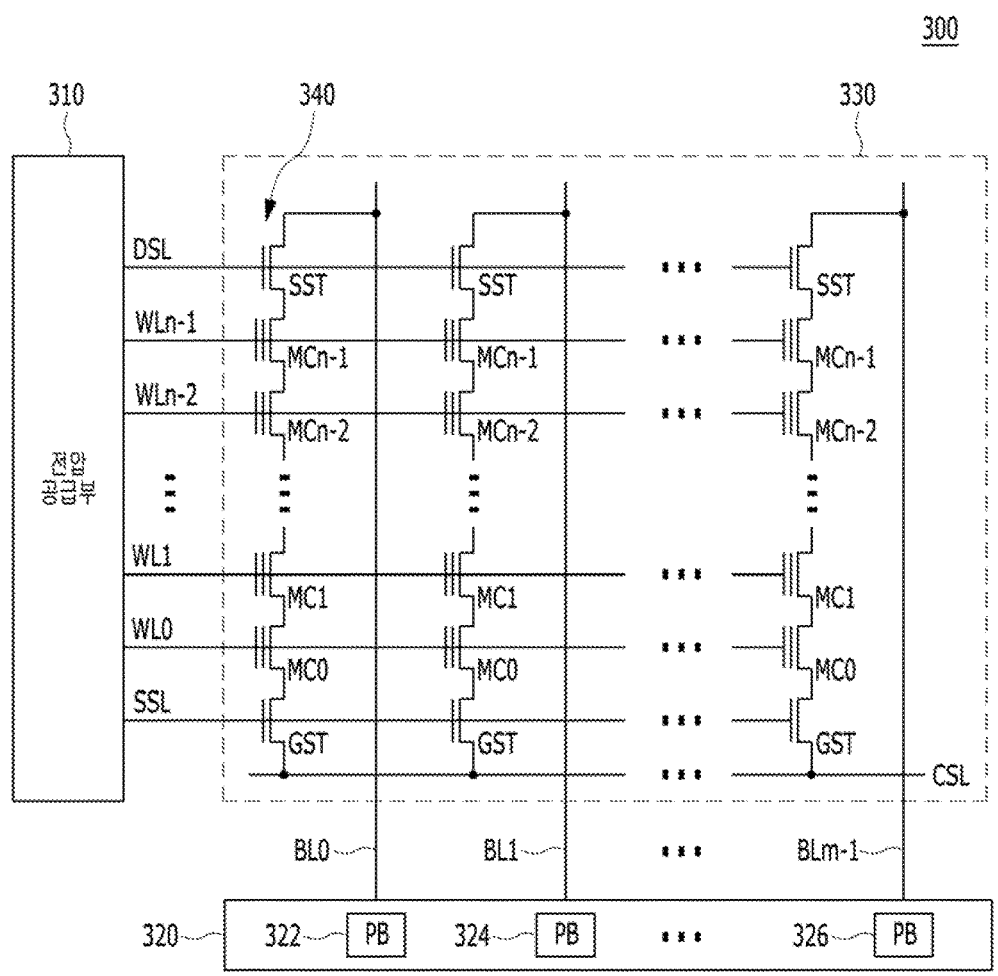
FIG. 3 is a circuit diagram illustrating a memory block in a memory device according to an embodiment of the present invention.

Referring to FIG. 3, a memory block 152 of the memory device 150 may include a plurality of cell strings 340 coupled electrically to bit lines BL0 to BLm-1 respectively. Each cell string 40 may include at least one drain select transistor DST and at least one source select transistor SST. A plurality of memory cells or a plurality of memory cell transistors MC0 to MCn-1 may be coupled electrically in series between the select transistors DST and SST. The respective memory cells MC0 to MCn-1 may consist of multi-level cells (MLC) each of which stores data information of a plurality of bits. The memory cells may have any suitable architecture.

In FIG. 3, 'DSL' denotes a drain select line, 'SSL.' denotes a source select line, and 'CSL' denotes a common source line.

FIG. 3 shows, as an example, a memory block 152 configured by NAND flash memory cells. It is to be noted, however, that the memory block 152 is not limited to NAND flash memory and may be realized, in other embodiments by NOR flash memory, hybrid flash memory having at least two kinds of memory cells combined, or a NAND flash memory having a controller built in a memory chip. Also, the operational characteristics of a semiconductor device may be applied to not only a flash memory device in which a charge storing layer configured by conductive floating gates but also to a charge trap flash (CTF) in which a charge storing layer is configured by a dielectric layer.

It is also noted that the memory device 150 is not limited to a flash memory device only. For example, the memory device 150 may be a DRAM or a SRAM device.

A voltage generator 310 of the memory device 150 may generate word line voltages, for example a program voltage, a read voltage or a pass voltage, to be supplied to respective word lines according to an operation mode. The voltage generator 310 may generate voltages to be supplied to bulks for example, well regions in which the memory cells are formed. The voltage generator 310 may perform a voltage generating operation under a control of a control circuit (not shown). The voltage generator 310 may generate a plurality of variable read voltages to generate a plurality of read data. The voltage generator 310 may select one of the memory blocks or sectors of a memory cell array, select one of the word lines of the selected memory block, and provide the word line voltages to the selected word line and unselected word lines, under the control of the control circuit.

A read/write circuit 320 of the memory device 150 may be controlled by the control circuit and may serve as a sense amplifier or a write driver according to an operation mode. During verification/normal read operation, the read/write circuit 320 may serve as a sense amplifier for reading data from the memory cell array. Also, during a program operation, the read/write circuit 320 may serve as a write driver for driving bit lines according to data to be stored in the memory cell array. The read/write circuit 320 may receive data to be written in the memory cell array, from a buffer (not shown), during the program operation, and may drive the bit lines according to the inputted data. To this end, the read/write circuit 320 may include a plurality of page buffers 322, 324 and 326 respectively corresponding to the columns (or bit lines) or pairs of the columns (or pairs of bit lines). Each of the page buffers 322, 324 and 326 may include a plurality of latches (not shown).

Figure 4:
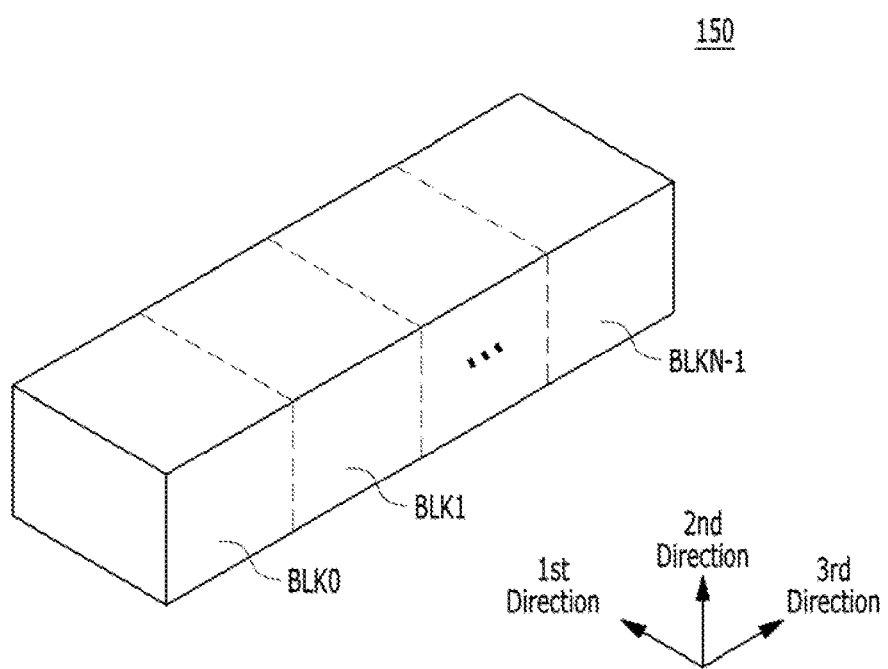
FIGS. 4 to 11 are diagrams schematically illustrating various aspects of the memory device shown in FIG. 2, according to an embodiment of the present invention.

FIG. 4 is a block diagram illustrating an example of the plurality of memory blocks 152 to 156 of the memory device 150, according to an embodiment of the present invention.

As shown in FIG. 4, the memory device 150 may include a plurality of memory blocks BLK0 to BLKN−1. Each of the memory blocks BLK0 to BLKN−1 may be realized in a 3D structure or a vertical structure. The respective memory blocks BLK0 to BLKN−1 may include a plurality of structures extending in first to third directions for example, an x-axis direction, a y-axis direction and a z-axis direction.

Figure 8:
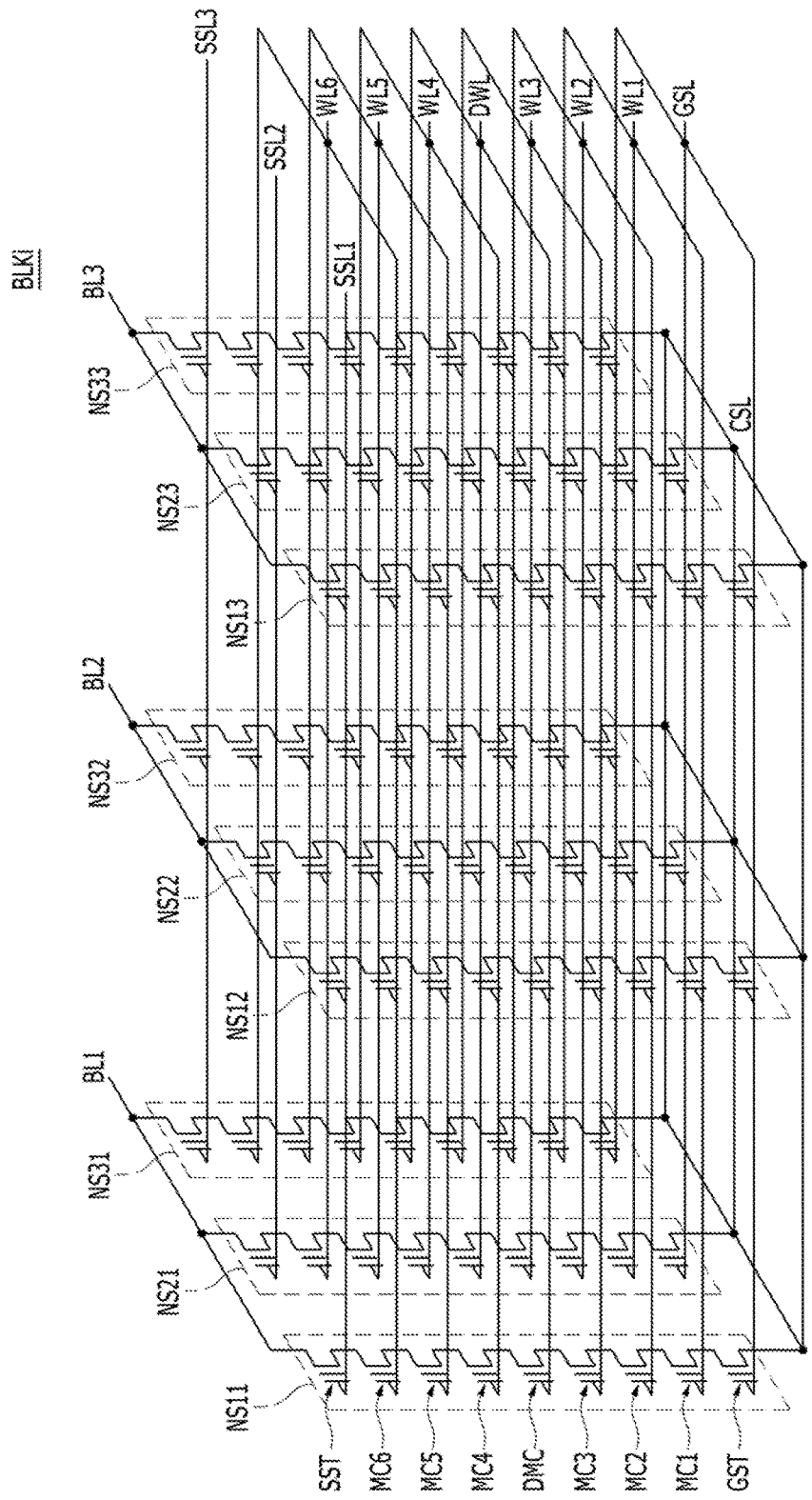

The respective memory blocks BLK0 to BLKN−1 may include a plurality of NAND strings NS extending in the second direction (FIG. 8). The plurality of NAND strings NS may be provided in the first direction and the third direction. Each NAND string NS may be coupled electrically to a bit line BL, at least one source select SSL, at least one ground select line GSL, a plurality of word lines WL, at least one dummy word line DWL, and a common source line CSL. The respective memory blocks BLK0 to BLKN−1 may be coupled electrically to a plurality of bit lines BL, a plurality of source select lines SSL, a plurality of ground select lines GSL, a plurality of word lines WL, a plurality of dummy word lines DWL, and a plurality of common source lines CSL.

Figure 5:
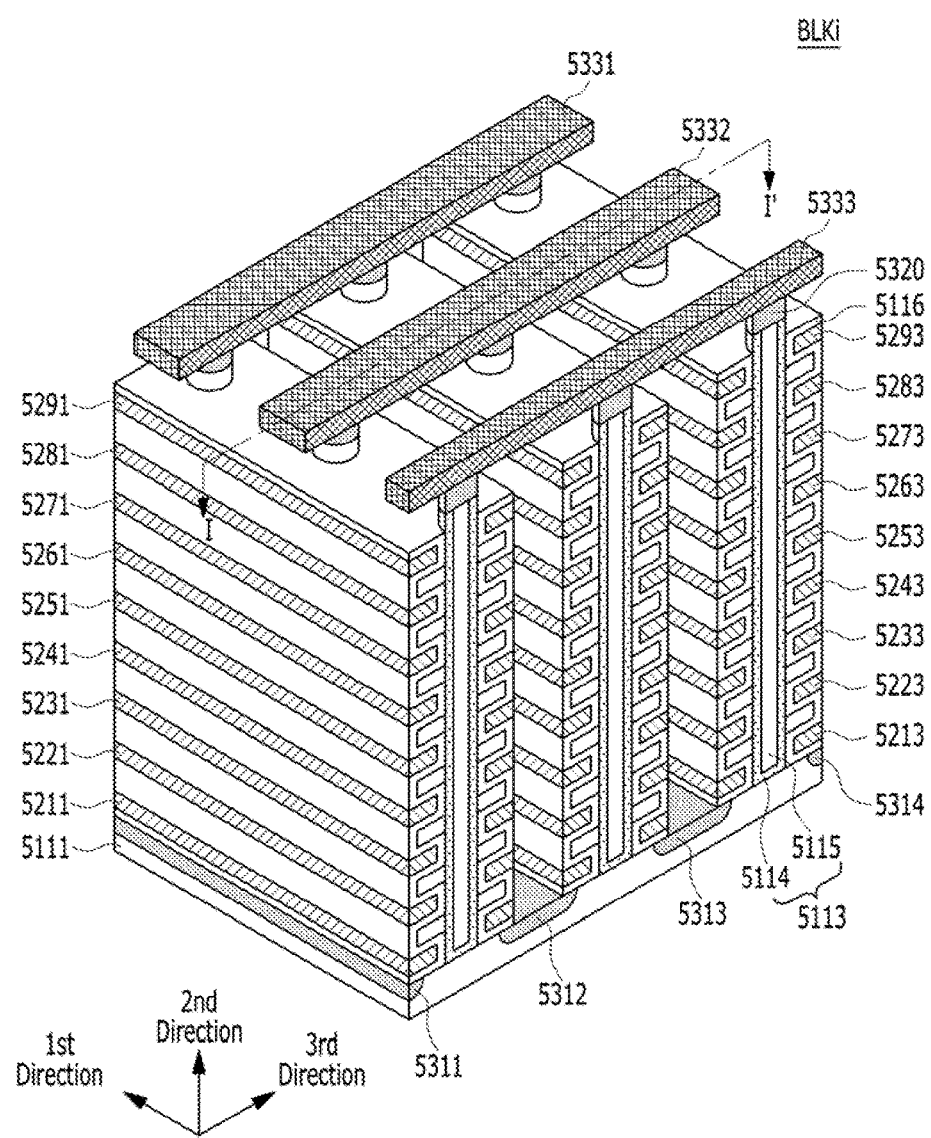
Figure 6:
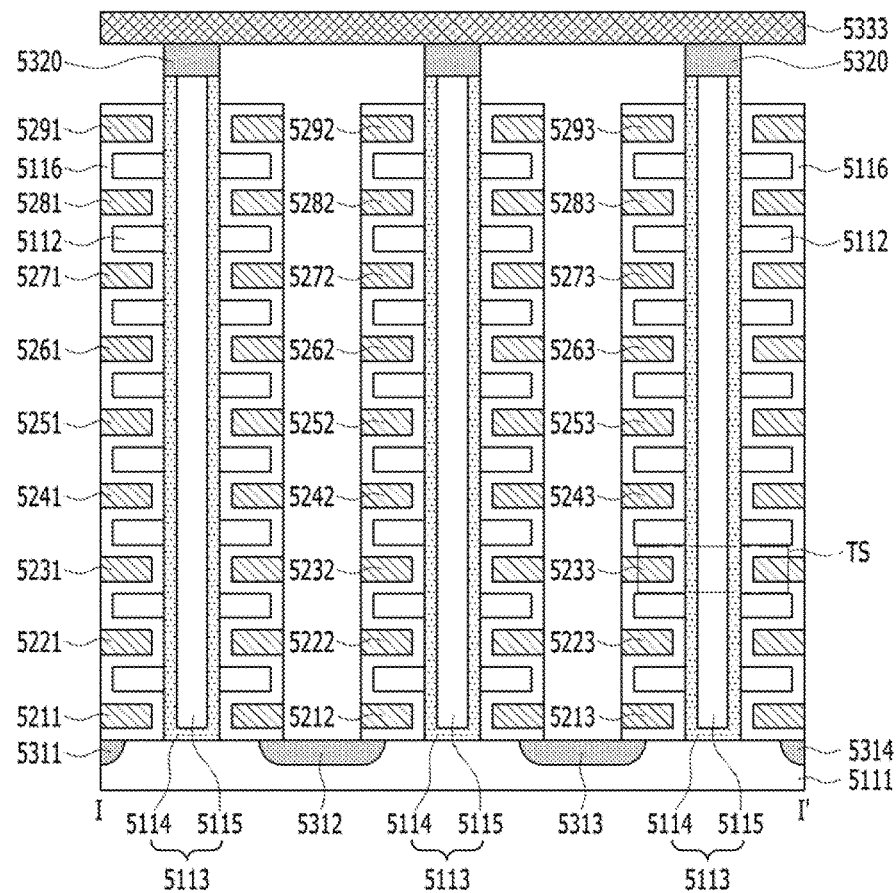

FIG. 5 is a perspective view of one memory block BLKi of the plurality memory blocks BLK0 to BLKN−1 shown in FIG. 4. FIG. 6 is a cross-sectional view taken along a line I-I' of the memory block BLKi shown in FIG. 5.

Referring to FIGS. 5 and 6 memory block BLKi may include a structure extending in the first to third directions.

The memory block may include a substrate 5111 including a silicon material doped with a first type impurity. For example, the substrate 5111 may include a silicon material doped with a p-type impurity. The substrate 5111 may be a p-type well, for example a pocket p-well. The substrate 5111 may further include an n-type well surrounding the p-type well. Although in the embodiment of the present invention, the substrate 5111 is exemplified as being the p-type silicon it is to be noted that the substrate 5111 is not limited to the p-type silicon.

A plurality of doping regions 5311 to 5314 extending in the first direction may be provided over the substrate 5111. The doping regions are spaced apart at regular intervals in the third direction. The plurality of doping regions 5311 to 5314 may contain a second type impurity that is different from that of the impurity used in substrate 5111. For example, the plurality of doping regions 5311 to 5314 may be doped with an n-type impurity. Although, in the embodiment of the present invention, first to fourth doping regions 5311 to 5314 are exemplified as being the n-type, it is noted that they are not limited to the n-type.

In the region over the substrate 5111 between the first and second doping regions 531 and 5312, a plurality of dielectric mate regions 5112 extending in the first direction may be spaced apart regular intervals in the second direction. The dielectric material regions 5112 may also be separated from the substrate 5111 by a preset distance in the second direction. Each of the dielectric material regions 5112 may be separated from one other by a preset distance in the second direction. The dielectric materials 5112 may include any suitable dielectric material, such as silicon oxide.

In the regions over the substrate 5111 between two consecutive doping regions, for example, between doping regions 5311 and 5312, a plurality of pillars 5113 are spaced apart at regular intervals in the first direction. The plurality of pillars 5113 extend in the second direction and may pass through the dielectric material regions 5112 so that they may be coupled electrically with the substrate 5111. Each pillar 5113 may include one or more materials. For example, each pillar 5113 may include an in inner layer 5115 and an outer surface layer 5114. The surface layer 5114 may include a doped silicon material doped with an impurity. For example, the surface layer 5114 may include a silicon material doped with the same or same type impurity as the substrate 5111. Although, in the embodiment of the present invention, the surface layer 5114 is exemplified as including p-type silicon, the surface layer 5114 is not limited to the p-type silicon and other embodiments may readily envisaged by the skilled person wherein the substrate 5111 and the surface layer 5114 of the pillars may be doped with an n-type impurity.

The inner layer 5115 of each pillar 5113 may be formed of a dielectric material. The inner layer 5115 may be or include a dielectric material such as silicon oxide.

In the regions between the first and second doping regions 5311 and 5312, a dielectric layer 5116 may be provided along exposed surfaces of the dielectric material regions 5112, the pillars 5113 and the substrate 5111. A thickness of the dielectric layer 5116 may be less than one half of the distance between the dielectric material regions 5112. In other words, a region of a material other than the dielectric material 5112 and the dielectric layer 5116 may be provided between (i) the dielectric layer 5116 below the bottom surface of a first dielectric material of the die electric material regions 5112 and (ii) the dielectric layer 5116 provided over the top surface of a second dielectric material of the dielectric material regions 5112. The dielectric material regions 5112 may lie below the first dielectric material.

In the regions between consecutive doping regions such as in the region between the first and second doping regions 5311 and 5312, a plurality of conductive material regions 5211 to 5291 may be provided over an exposed surface of the dielectric layer 5116. The plurality of the conductive material regions extending in the first direction may be spaced apart at regular intervals in the second direction in an interleaving configuration with the plurality of the dielectric material regions 5112. The dielectric layers 5116 fill the space between the conductive material regions and the dielectric material regions 5112. So for example, the conductive material region 5211 extending in the first direction may be provided between the dielectric material region 5112 adjacent to the substrate 5111 and the substrate 5111. In particular, the conductive material region 5211 extending in the first direction may be provided between (i) the dielectric layer 5116 disposed over the substrate 5111 and (ii) the dielectric layer 5116 disposed below the bottom surface of the dielectric material region 5112 adjacent to the substrate 5111.

Each of the conductive material regions 5211 to 5291 extending in the first direction may be provided between (i) a dielectric layer 5116 disposed over the top surface of one of the dielectric material regions 5112 and (ii) the dielectric layer 5116 disposed below the bottom surface of the next dielectric material region 5112. The conductive material regions 5221 to 5281 extending in the first direction may be provided between the dielectric material regions 5112. The top conductive material region 5291 extending in the first direction may be provided over the uppermost dielectric material 5112. The conductive material regions 5211 to 5291 extending in the first direction may be made of or include a metallic material. The conductive material regions 5211 to 5291 extending in the first direction may be made of or include a conductive material such as polysilicon.

In the region between the second doping region 5312 and third doping region 5313, the same structures as the structures between the first and second doping regions 5311 and 5312 may be provided. For example, in the region between the second and third doping regions 5312 and 5313, the plurality of dielectric material regions 5112 extending in the first direction, the plurality of pillars 5113 which are sequentially arranged in the first direction and pass through the plurality of dielectric material regions 5112 in the second direction, the dielectric layer 5116 which is provided over the exposed surfaces of the plurality of dielectric material regions 5112 and the plurality of pillars 5113, and the plurality of conductive material regions 5212 to 5292 extending in the first direction may be provided.

In the region between the third doping region 5313 and a fourth doping region 5314, the same structures as between the first an d second doping regions 5311 and 5312 may be provided. For example, in the region between the third and fourth doping regions 5313 and 5314 the plurality of dielectric material regions 5112 extending in the first direction, the plurality of pillars 5113 which are sequentially arranged in the first direction and pass through the plurality of dielectric material regions 5112 in the second direction, the dielectric layer 5116 which is provided over the exposed surfaces of the plurality of dielectric material regions 5112 and the plurality of pillars 5113, and the plurality of conductive material regions 5213 to 5293 extending in the first direction may be provided.

Drains 5320 may be respectively provided over the plurality of pillars 5113. The drains 5320 may be made of silicon materials doped with second type impurities. The drains 5320 may be made of silicon materials doped with n-type impurities. Although for the sake of convenience of explanation, the drains 5320 are exemplified as including n-type silicon, it is noted that the drains 5320 are not limited to the n-type silicon. For example the width of each drain 5320 may be larger than the width of each corresponding pillar 5113. Each drain 5320 may be provided in, the shape of a pad over the top surface of each corresponding pillar 5113.

Conductive material regions 5331 to 5333 extending in the third direction may be provided over the drains 5320. Each of the conductive material regions 5331 to 5333 may be extendedly disposed over the drains 5320 serially arranged in the third direction with a preset separation distance to each other in the first direction. The respective conductive material regions 5331 to 5333 may be coupled electrically with the drains 5320 therebelow. The drains 5320 and the conductive material regions 5331 to 5333 extending in the third direction may be coupled electrically with through contact plugs. The conductive material regions 5331 to 5333 extending in the third direction may be made of a metallic material. The conductive material regions 5331 to 5333 extending in the third direction may be made of a conductive material such as polysilicon.

In FIGS. 5 and 6, the respective pillars 5113 may form strings together with the dielectric layer 5116 and the conductive material regions 5211 to 5291, 5212 to 5292 and 5213 to 5293 extending in the first direction. The respective pillars 5113 may form NAND strings NS together with the dielectric layer 5116 and the conductive material regions 5211 to 5291, 5212 to 5292 and 5213 to 5293 extending in the first direction. Each NAND string NS may include a plurality of transistor structures TS.

Figure 7:
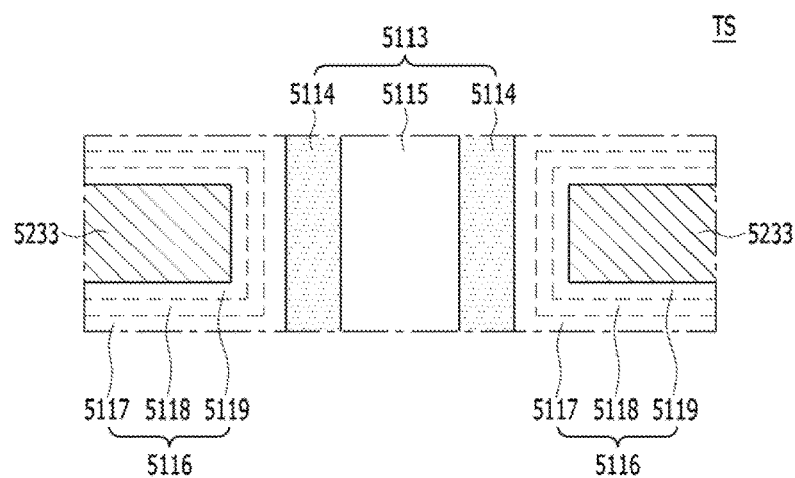

Referring now to FIG. 7 in the transistor structure TS shown in FIG. 6, the dielectric layer 5116 may include first to third sub dielectric layers 5117, 5118 and 5119.

The surface layer 5114 of p-type silicon in each of the pillars 5113 may serve, as a body. The first sub dielectric layer 5117 adjacent to the pillar y serve as a tunneling dielectric layer, and may include a thermal oxidation layer.

The second sub die electric layer 5118 may serve a charge storing layer. The second sub dielectric layer 5118 may serve as a charge capturing layer, and may include a nitride layer or a metal oxide layer such as an aluminum oxide layer a hafnium oxide layer, or the like.

The third sub dielectric layer 5119 adjacent to the conductive material 5233 may serve as a blocking dielectric layer. The third sub dielectric layer 5119 adjacent to the conductive material 5233 extending in the first direction may be formed as a single layer or multiple layers. The third sub dielectric layer 5119 may be a high-k dielectric layer such as an aluminum oxide layer, a hafnium oxide layer, or the like, which has a dielectric constant greater than the and second sub dielectric layers 5117 and 5118.

The conductive material 5233 may serve as a gate or a control gate. For example, the gate or the control gate 5233, the blocking dielectric layer 5119, the charge storing layer 5118, the tunneling dielectric layer 5117 and the body 5114 may form a transistor or a memory cell transistor structure. For example, the first to third sub dielectric layers 5117 to 5119 may form an oxide-nitride-oxide (ONO) structure. In the embodiment, for the sake of convenience of explanation, the surface layer 5114 of p-type silicon in each of the pillars 5113 will be referred to as a body in the second direction.

The memory block BLKi may include the plurality of pillars 5113. For example, the memory block BLKi may include the plurality of NAND strings NS. In detail, the memory block BLKi may include the plurality of NAND strings NS extending in the second direction or a direction perpendicular to the substrate 5111.

Each NAND string NS may include the plurality of transistor structures TS which are disposed in the second direction. At least one of the plurality of transistor structures TS of each NAND string NS may serve as a string source transistor SST. At least one of the plurality of transistor structures TS of each NAND string NS may serve as a ground select transistor GST.

The gates or control gates may correspond to the conductive material regions 5211 to 5291, 5212 to 5292 and 5213 to 5293 extending in the first direction. For example, the gates or the control gates may extend in the first direction and form word lines and at least two select lines including at least one source select line SSL and at least one ground select line GSL.

The conductive material regions 5331 to 5333 extending in the third direction may be coupled electrically to one end of the NAND strings NS. The conductive material regions 5331 to 5333 extending in the third direction may serve as bit lines BL. For example, in one memory block BLKi the plurality of NAND strings NS may be coupled electrically to one-bit line BL.

The second type doping regions 5311 to 5314 extending in the first direction may be provided to the other ends of the NAND strings NS. The second type doping regions 5311 to 5314 extending in the first direction may serve as common source lines CSL.

For example, the memory block BLKi may include a plurality of NAND strings NS extending in direction perpendicular to the substrate 5111, e.g., the second direction, and may serve as a NAND flash memory block, for example, of a charge capturing type memory, in which the plurality of NAND strings NS are coupled electrically to one-bit line BL.

Although it is illustrated in FIGS. 5 to 7 that the conductive material regions 5211 to 5291, 5212 to 5292 and 5213 to 5293 extending in the first direction are provided by nine (9) layers, it is noted that the conductive material regions 5211 to 5291, 5212 to 5292 and 5213 to 5293 extending in the first direction are not limited thereto. For example, conductive material regions extending in the first direction may be provided in eight (8) layers, sixteen (16) layers or any multiple layers. For example, in one NAND string NS, the number of transistors may be 8, 16 or more.

Although it is illustrated in FIGS. 5 to 7 that three (3) NAND strings NS are coupled electrically to one-bit line BL, it is noted that the embodiment is not incited thereto. In the memory block BLKi, m NAND strings NS may be coupled electrically to one-bit line BL, m being a positive integer. The number of conductive material regions 5211 to 5291, 5212 to 5292 and 5213 to 5293 extending in the first direction and the number of common source lines 5311 to 5314 may be varied with the number of NAND strings NS which are coupled electrically to one-bit line BL.

Further, although it is illustrated in FIGS. 5 to 7 that three (3) NAND strings NS are coupled electrically to one conductive material extending in the first direction, it is noted that the embodiment is not limited thereto. For example, n NAND strings NS may be coupled electrically to one conductive material extending in the first direction, n being a positive integer. The number of bit lines 5331 to 5333 may be varied with the number of NAND strings NS which are coupled electrically to one conductive material extending in the first direction.

Referring to FIG. 8, in a block BLKi having the first structure, a plurality of NAND strings NS11 to NS31 may be provided between a first bit line BL1 and a common source line CSL. The first bit line BL1 may correspond to the conductive material region 5331 of FIGS. 5 and 6, extending in the third direction. NAND strings NS12 to NS32 may be provided between a second bit line BL2 and the common source line CSL. The second bit line BL2 may correspond to the conductive material region 5332 of FIGS. 5 and 6 extending in the third direction, NAND strings NS13 to NS33 may be provided between a third bit line BL3 and the common source line CSL. The third bit line BL3 may correspond to the conductive material region 5333 of FIGS. 5 and 6, extending in the third direction.

A source select transistor SST of each NAND string NS may be coupled electrically to a corresponding bit line BL. A ground select transistor GST of each NAND string NS may be coupled electrically to the common source line CSL. Memory cells MC1 and MC6 may be provided between the source select transistor SST and the ground select transistor GST of each NAND string NS.

In this example, the NAND strings NS may be defined by units of rows and columns. The NAND strings NS which are coupled electrically to one-bit line may form one column. The NAND strings NS11 to NS31 which are coupled electrically to the first bit line BL1 may correspond to a first column. The NAND strings NS12 to NS32 which are coupled electrically to the second bit line BL2 may correspond to a second column. The NAND strings NS13 to NS33 which are coupled electrically to the third bit line BL3 may correspond to a third column. The NAND strings NS which are coupled electrically to one source select line SSL may form one row. The NAND strings NS11 to NS13 which are coupled electrically to first source select line SSL1 may form a first row. The NAND strings NS21 to NS23 which are coupled electrically to a second source select line SSL2 may form a second row. The NAND strings NS31 to NS33 which are coupled electrically to a third source select line SSL3 may form a third row.

In each NAND string NS, a height may be defined. In each NAND string NS the height of the memory cell MC1 adjacent to the ground select transistor GST may have, for example, a value '1'. In each NAND string NS, the height of a memory cell may increase as the memory cell gets closer to the source select transistor SST when measured from the substrate 5111. For example, in each NAND string NS, the height of a memory cell MC6 adjacent to the source select transistor SST may have, for example a value '7'.

The source select transistors SST of the NAND strings NS arranged in the same row may share the source select line SSL. The source select transistors SST of the NAND strings NS arranged in different rows may be respectively coupled electrically to the different source select lines SSL1, SSL2 and SSL3.

The memory cells at the same height in the NAND strings NS in the same row may share a word line WL. For example, at the same height, the word lines WL coupled electrically to the memory cells MC of the NAND strings NS in different rows may be coupled electrically with each other. Dummy memory cells DMC at the same height in the NAND strings NS of the same row may share a dummy word line DWL. For example, at the same height or level the dummy word lines DWL coupled electrically to the dummy memory cells DMC of the NAND strings NS in different rows may be coupled electrically with each other.

The word lines WL or the dummy word lines DWL located at the same level or height or layer may be coupled electrically with each other for each of the layers where the conductive material regions 5211 to 5291, 5212 to 5292 and 5213 to 5293 extending in the first direction may be provided. The conductive material regions 5211 to 5291, 5212 to 5292 and 5213 to 5293 extending in the first direction may be coupled electrically in common to upper layers through contacts. In other words, the ground select transistors GST of the NAND strings NS in the same row may share the ground select line GSL. Further, the ground select transistors GST of the NAND strings NS in different rows may share the ground select line GSL. For example, the NAND strings NS11 to NS13, NS21 to NS23 and NS31 to NS33 may be coupled electrically in common to the ground select line GSL.

The common source line CSL may be coupled electrically in common to the NAND strings NS. Over the active regions over the substrate 5111, the first to fourth doping regions 5311 to 5314 may be coupled electrically. The first to fourth doping regions 5311 to 5314 may be coupled electrically in common to an upper layer through contacts.

For example, as shown in FIG. 8, the word lines WL of the same height or level may be coupled electrically to each other. Accordingly, when a word line WL at a certain height is selected, all NAND strings NS which are coupled electrically to the selected word line WL may be selected. The NAND strings NS in different rows may be coupled electrically to different source select lines SSL. Accordingly among the NAND strings NS coupled electrically to the same word line WL, by selecting one of the source select lines SSL1 to SSL3, the NAND string NS in the unselected rows may be electrically isolated from the bit lines BL1 to BL3. In other words by selecting one of the source select lines SSL1 to SSL3, the NAND strings NS arranged in the same row as the selected source line may be selected. Furthermore, by selecting one of the bit lines BL1 to BL3, the NAND string s NS arranged in the sag column as the selected bit line may be selected. Accordingly, only the NAND strings NS arranged in the same row as the selected source line and the same column as the selected bit line may be selected. In each NAND string NS, a dummy memory cell DMC may be provided. In FIG. 8, for example, the dummy memory cell DMC may be provided between a third memory cell MC3 and a fourth memory cell MC4 in each NAND string NS. For example, first to third memory cells MC1 to MC3 may be provided between the dummy memory cell DMC and the ground select transistor GST. Fourth to sixth memory cells MC4 to MC6 may be provided between the dummy memory cell DMC and the source select transistor SST. The memory cells MC of each NAND string NS may be divided into two (2) memory cell groups by the dummy memory cell DMC. In the divided memory cell groups, memory cells, for example, MC1 to MC3, adjacent to the ground select transistor GST may be referred to as a lower memory cell group, and remaining memory cells, for example, MC4 to MC6, adjacent to the string select transistor SST may be referred to as an upper memory cell group.

Herein below, detailed descriptions will be made with reference to FIGS. 9 to 11, which show a memory device in a memory system, according to an embodiment implemented with a three-dimensional (3D) nonvolatile memory device different from the first structure.

Figure 9:
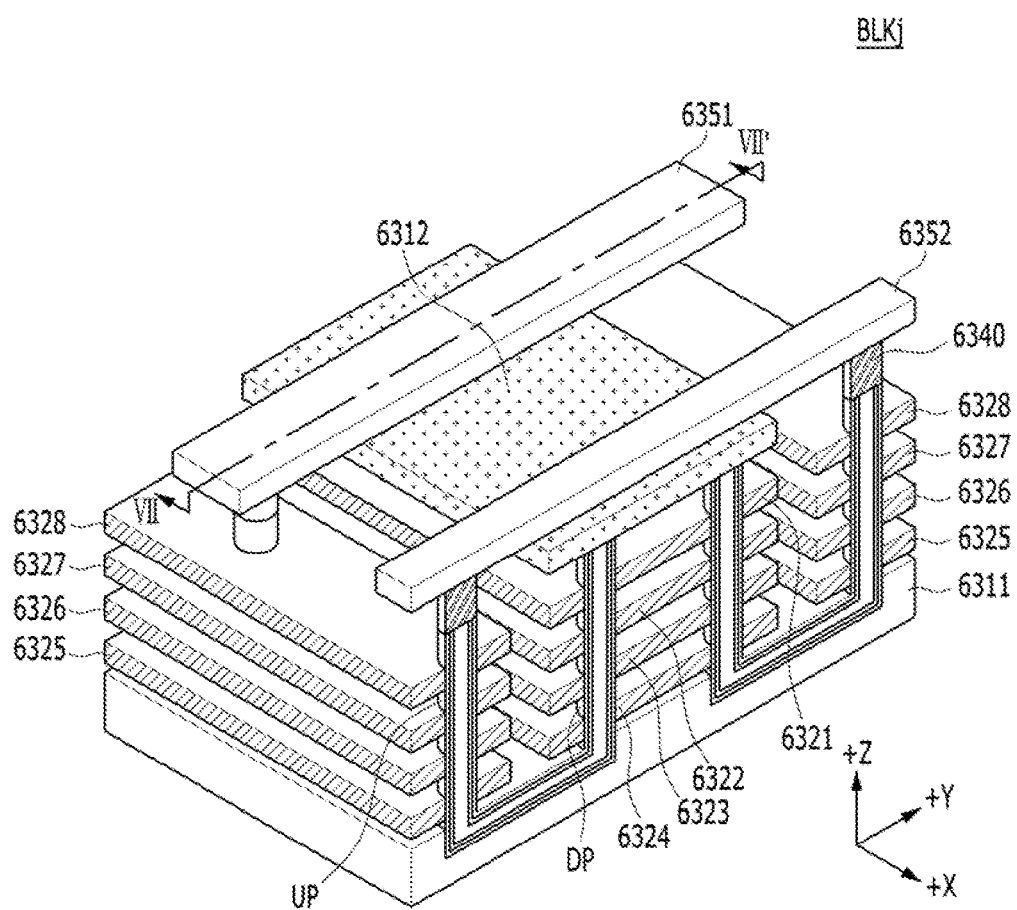

FIG. 9 is a perspective view schematically illustrating a memory device implemented with a three-dimensional (3D) nonvolatile memory device, which is different from the first structure described above with reference to FIGS. 5 to 8 and showing a memory block BLKj of the plurality of memory blocks of FIG. 4. FIG. 10 is a cross-sectional view illustrating the memory block BLKj taken along the line VII-VII' of FIG. 9.

Figure 10:
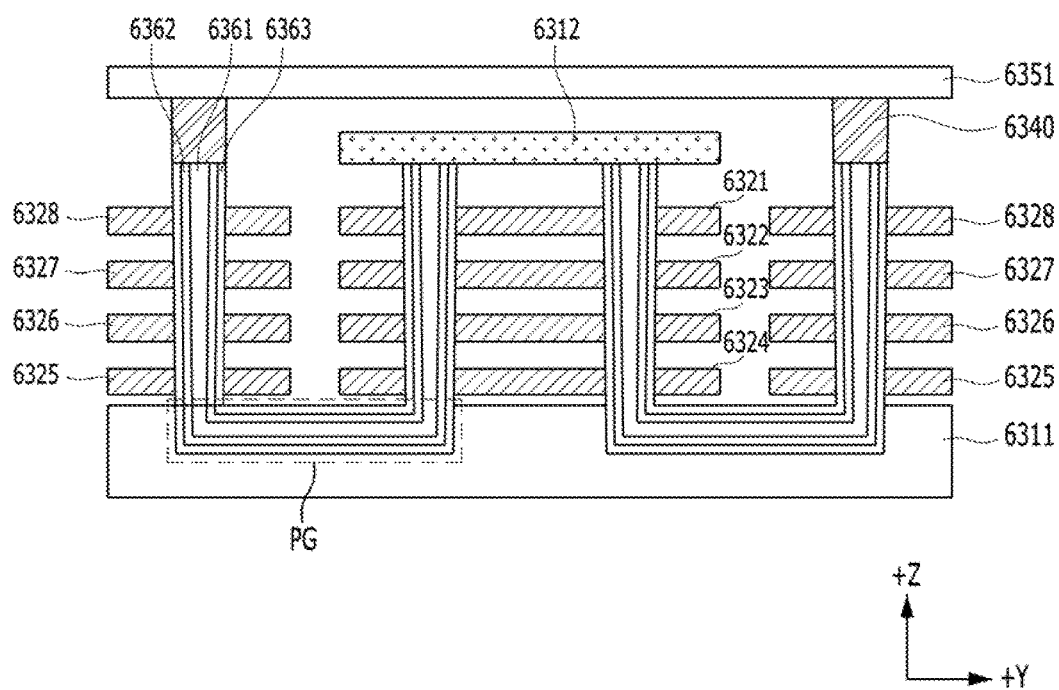

Referring to FIGS. 9 and 10, the memory block BLKj may include structures extending in the first to third directions and may include a substrate 6311. The substrate 6311 may include a silicon material doped with a first type impurity. For example, the substrate 6311 may include a silicon material doped with a p-type impurity. The substrate 6311 may be a p-type well, for example, a pocket p-well. The substrate 6311 may further include an n-type well which surrounds the p-type well. Although, in the described embodiment, the substrate 6311 is exemplified as being the p-type silicon, it is noted that the substrate 6311 is not limited to the p-type silicon.

First to fourth conductive material regions 6321 to 6324 extending in an x-axis direction and a y-axis direction are provided over the substrate 6311. The first to fourth conductive material regions 6321 to 6324 may be separated by a preset distance in the z-axis direction.

Fifth to eighth conductive material regions 6325 to 6328 extending in the x-axis direction and the y-axis direction may be provided over the substrate 6311. The fifth to eighth conductive material regions 6325 to 6328 may be separated by the preset distance in the z-axis direction. The fifth to eighth conductive material regions 6325 to 6328 may be separated from the first to fourth conductive material regions 6321 to 6324 in the y-axis direction.

A plurality of lower pillars DP passing through the first to fourth conductive material regions 6321 to 6324 may be provided. Each lower pillar DP may extend in the z-axis direction. Also, a plurality of upper pillars UP passing through the fifth to eighth conductive material regions 6325 to 6328 may be provided. Each upper pillar UP may extend in the z-axis direction.

Each of the lower pillars DP and the upper pillars UP may include an internal, material 6361, an intermediate layer 6362, and a surface layer 6363. The intermediate layer 6362 may serve as a channel of the cell transistor. The surface layer 6363 may include a blocking dielectric layer, a charge storing layer and a tunneling dielectric layer.

The lower and the upper pillars DP and UP may be coupled electrically with each other through a pipe gate PG. The pipe gate PG may be disposed in the substrate 6311. For example, the pipe gate PG may include the same material as the lower pillar DP and the upper pillar UP.

A doping material 6312 of a second type extending in the x-axis direction and the y-axis direction may be provided over the lower pillars DP. For example, the doping material 6312 of the second type may include an n-type silicon material. The do ping material 6312 of the second type may serve as a common source line CSL.

Drains 6340 may be provided over the upper pillars UP. The drains 6340 may include an n-type silicon material. First and second upper conductive material regions 6351 and 6352 extending in the y axis direction may be provided over the drains 6340.

The first and second upper conductive material regions 6351 and 6352 may be spaced apart along the x-axis direction. The first and second upper conductive material regions 6351 and 6352 may be formed of a metal. The first and second upper conductive material regions 6351 and 6352 and the drains 6340 may be coupled electrically with each other through contact plugs. The first and second upper conductive material regions 6351 and 6352 may serve as first and second bit lines BL1 and BL2, respectively.

The first conductive material 6321 may serve as a source select line SSL. The second conductive material 6322 may serve as a first dummy word line DWL1. The third and fourth conductive material regions 6323 and 6324 may serve as first and second main word lines MWL1 and MWL2, respectively. The fifth and sixth conductive material regions 6325 and 6326 may serve as third and fourth main word lines MWL3 and MWL4, respectively. The seventh conductive material 6327 may serve as a second dummy word line DWL2. The eighth conductive material 6328 may serve as a drain select line DSL.

The lower pillar DP and the first to fourth conductive material regions 6321 to 6324 adjacent to the lower pillar DP may form a lower string. The upper pillar UP and the fifth to eighth conductive material regions 6325 to 6328 adjacent to the upper pillar UP may form an upper string. The lower string and the upper string may be coupled electrically with each other through the pipe gate PG. One end of the lower string may be coupled electrically to the doping material 6312 of the second type which serves as the common source line CSL. One end of the upper string may be coupled electrically to a corresponding bit line through the drain 6340. One lower string and one upper string may form one cell string which is coupled electrically between the doping material 6312 serving as the common source line CSL and a corresponding one of the upper conductive material layers 6351 and 6352 serving as the bit line BL.

For example, the lower string may include a source select transistor SST, the first dummy memory cell DMC1 and the first and second main memory cells MMC1 and MMC2. The upper string may include the third and fourth main memory cells MMC3 and MMC4, the second dummy memory cell DMC2, and a drain select transistor DST.

In FIGS. 9 and 10, the upper string and the lower string may form a NAND string NS. The NAND string NS may include a plurality of transistor structures TS. Since the transistor structure included in the NAND string NS in FIGS. 9 and 10 is described above in detail with reference to FIG. 7, a detailed description thereof will be omitted herein.

Figure 11:
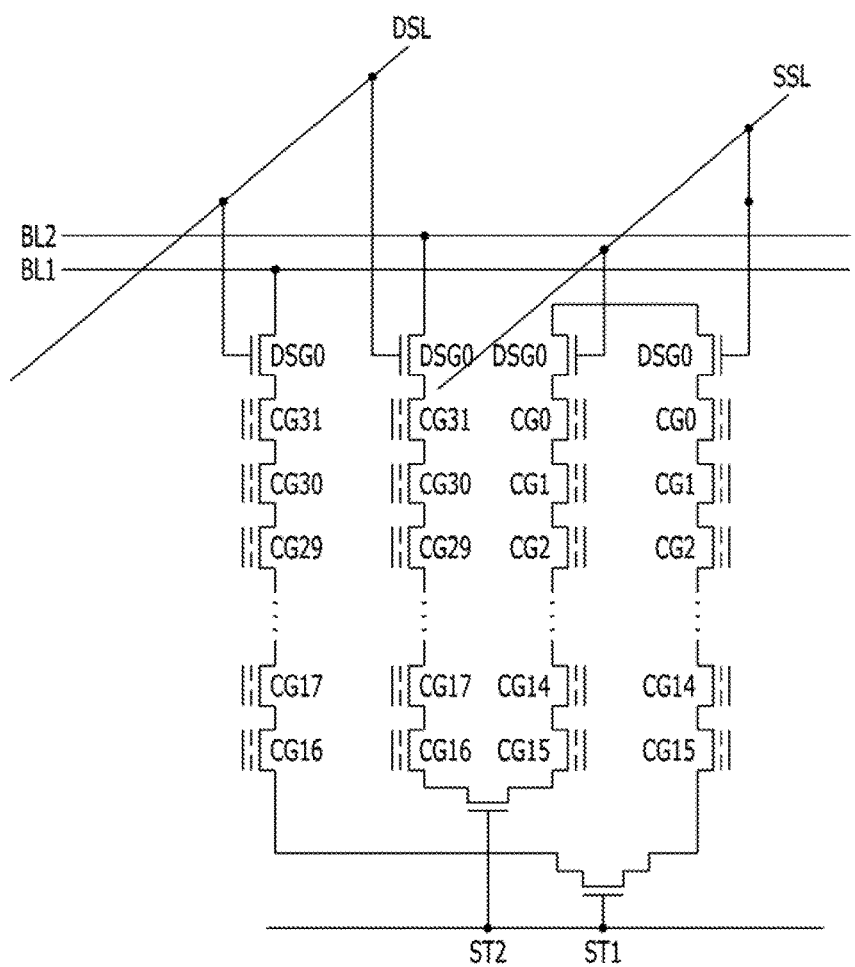

FIG. 11 a circuit diagram illustrating the equivalent circuit of the memory block BLKj having the second structure as described above with reference to FIGS. 9 and 10. For the sake of convenience, only a first string ST1 and a second string ST2 are shown, forming a pair in the memory block BLKj in the second structure.

Referring to FIG. 11, in the memory block BLKj having the second structure, a plurality strings, each of which is implemented with one upper string and one lower string coupled electrically through the pipe gate PG as described above with reference to FIGS. 9 and 10, may be provided, in such a way as to define a plurality of pairs.

For example, in memory block BLKj having the second structure, memory cells CG0 to CG31 stacked along a first channel CH1 (not, shown), for example, at least one source select gate SSG1 and at least one drain select gate DSG1 may form a first string ST1, and memory cells CG0 to CG31 stacked along a second channel CH2 (not shown), for example at least one source select gate SSG2 and at least one drain select gate DSG2 may form a second string ST2.

The first, and the second strings ST1 and ST2 may be coupled electrically to the same drain select line DSL and the same source select line SSL. The first string ST1 may be coupled electrically to a first bit line BL1. The second string ST2 may be coupled electrically to a second bit line BL2.

Although FIG. 11 shows the first string ST1 and the second string ST2 are coupled, electrically to the same drain select line DSL and the same source select line SSL, it may be envisaged that the first string ST1 and the second string ST2 may be coupled electrically to the same source select line SSL and the same bit line BL, the first string ST1 may be coupled electrically to a first drain select line DSL1 and the second string ST2 may be coupled electrically to a second drain select line DSL2. Further it may be envisaged that the first string ST1 and the second string ST2 may be coupled, electrically to the same drain select line DSL and the same bit line BL, the first string ST1 may be coupled electrically to a first source select line SSL1 and the second string ST2 may be coupled electrically a second source select line SSL2.

Now, with reference to FIGS. 12 to 15, data processing into the memory device 150 in the memory system 100 will be described in more detail. In particular, a command operation corresponding to a command received from the host 102, e.g., an operation for processing command data into the memory device 150, will be described in more, detail below.

Figure 12:
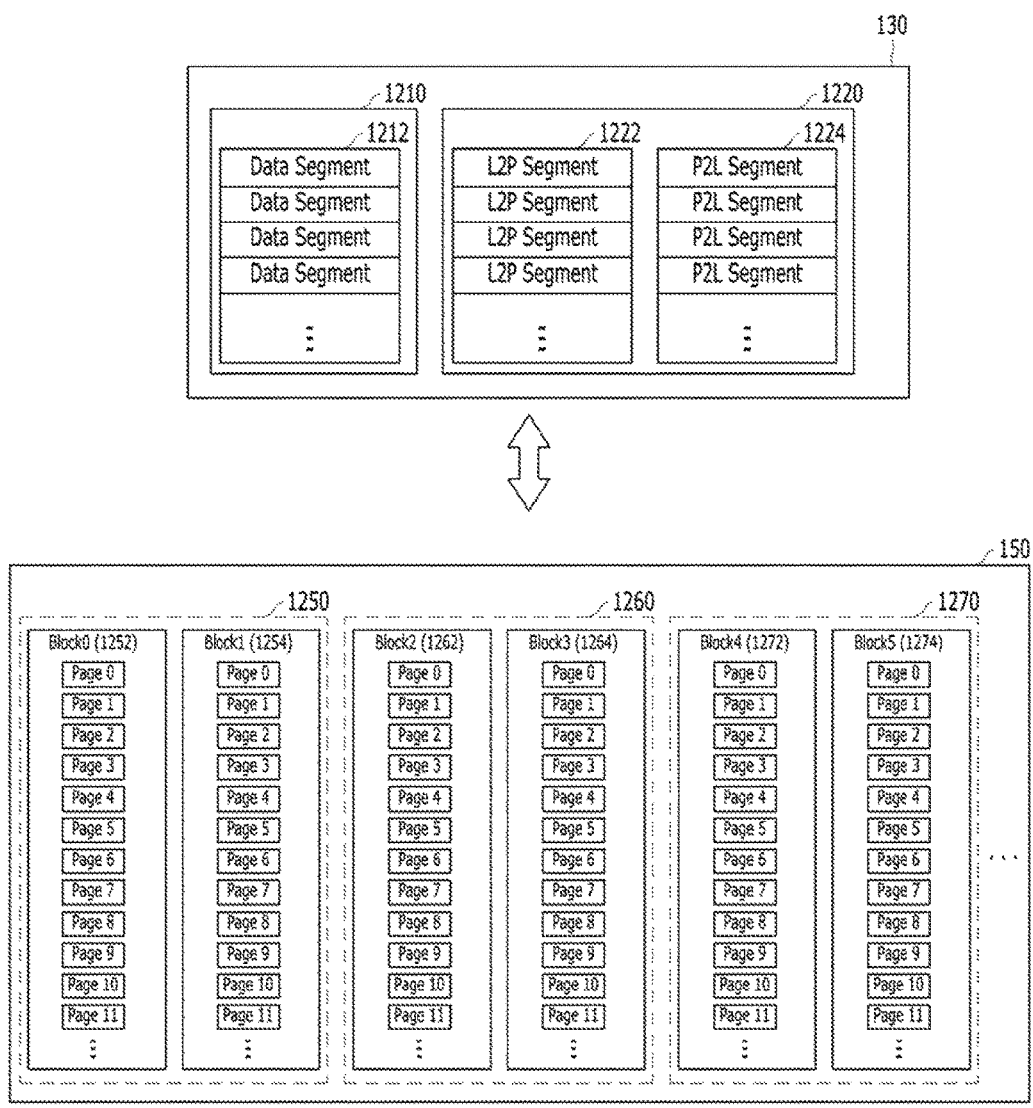
FIGS. 12 to 14 are diagrams schematically illustrating an example of a data processing operation for the memory device in the memory system, according to an embodiment of the present invention.
Figure 13:
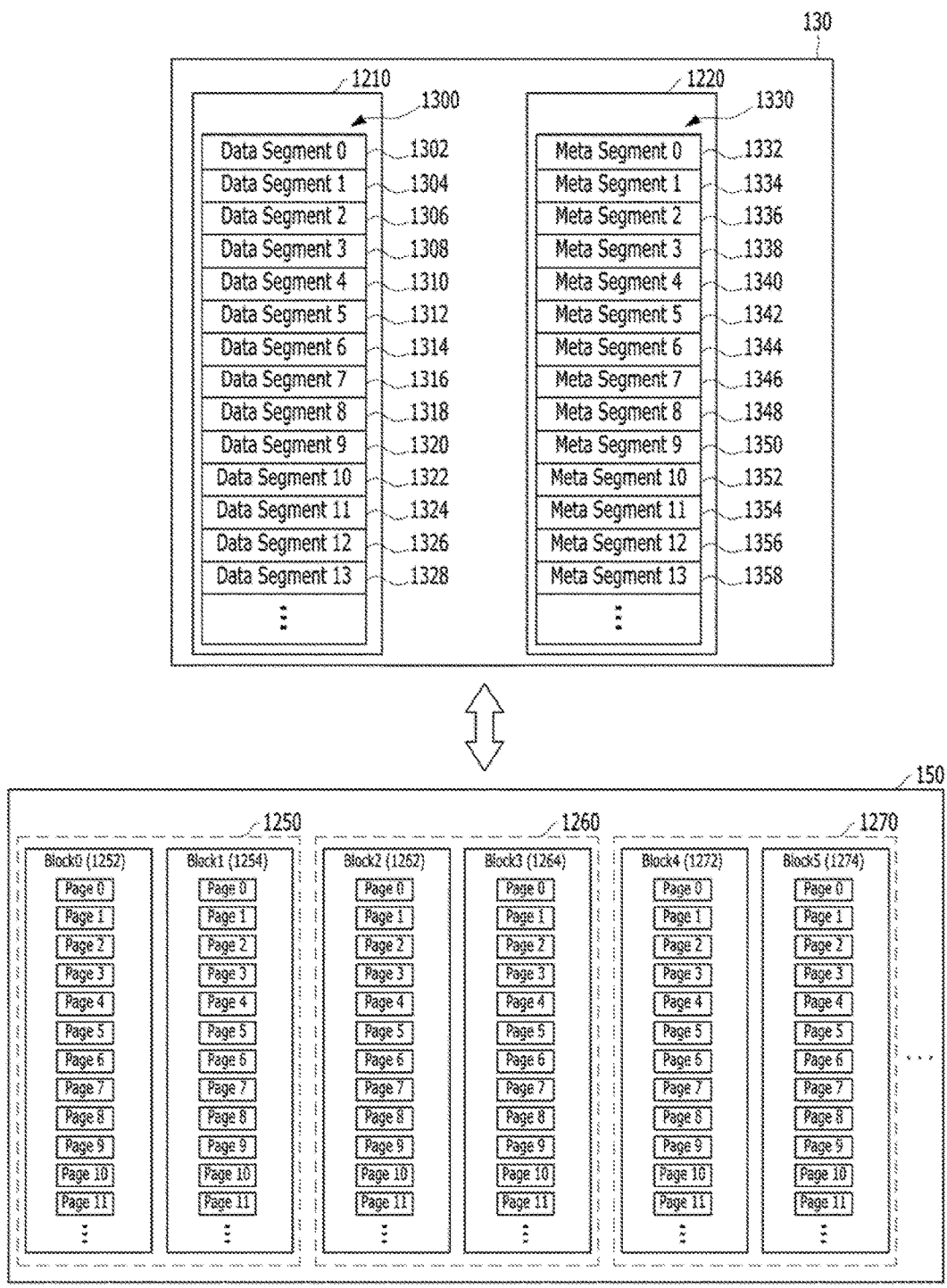
Figure 14:
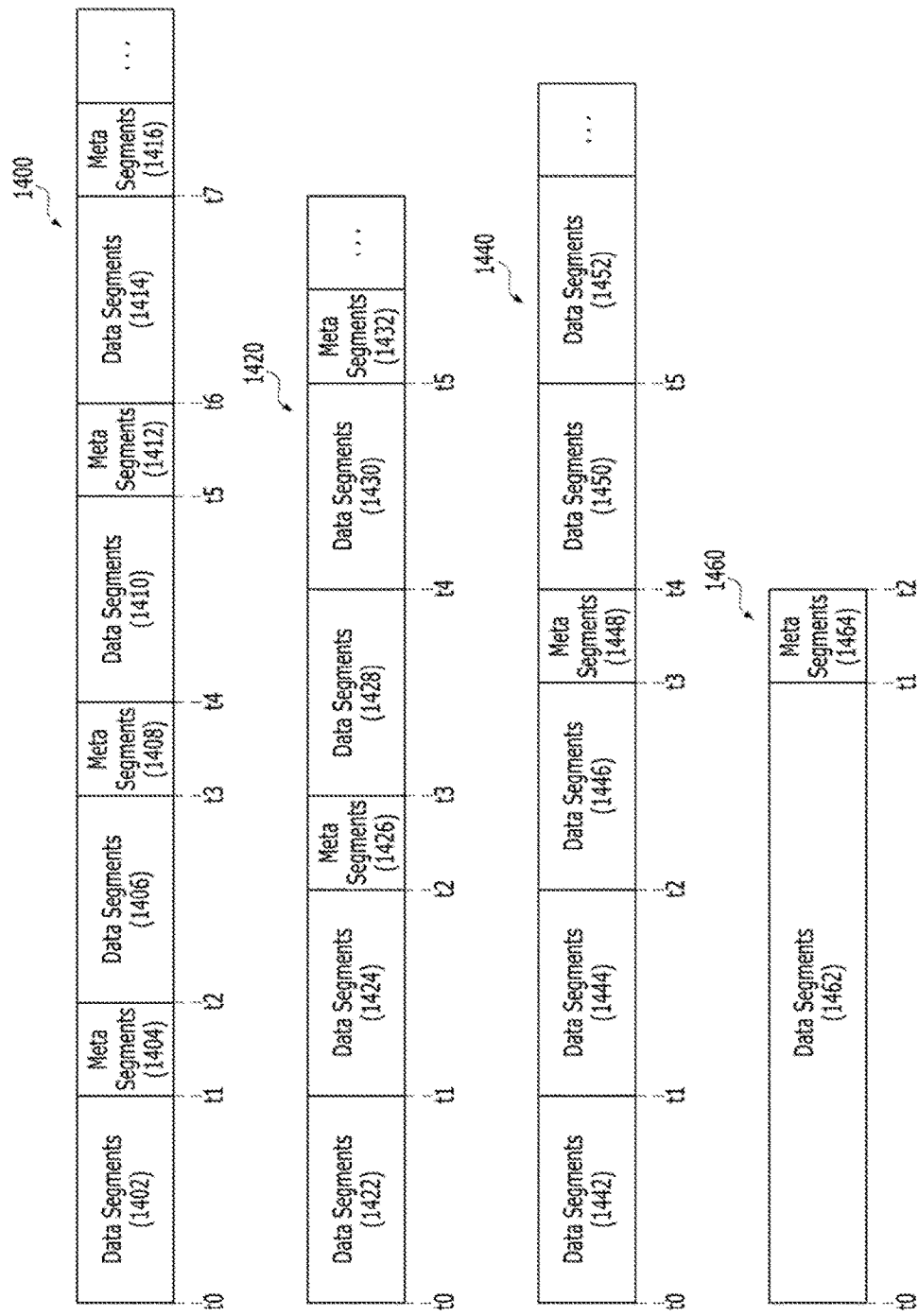

FIGS. 12 to 14 are diagrams schematically illustrating examples of a data processing operation for the memory device in the memory system, according to an embodiment of the present invention.

In an example of data processing, command data corresponding to a command received from the host 102 (e.g., write data corresponding to a write command received from the host 102) is stored in a plurality of memory blocks included in the memory device 150. Also, metadata for the command data and the plurality of memory blocks is generated and updated. For example, metadata including map data corresponding to the writing of the command data in the plurality of memory blocks is generated and updated. Furthermore, the generated and updated metadata is stored in the plurality of memory blocks.

Furthermore, an example in which a data processing operation in the memory system is performed by the controller 130 of FIG. 1 is illustrated hereinafter, for convenience of description. However, as described above, the processor 134 of the controller 130 may perform data processing through FTL. Furthermore, the controller 130 performs a command operation (e.g., a write operation) corresponding to a command received from the host 102. An example of data processing in a write operation by the controller 130 may include storing user data corresponding to the command in memory blocks of the memory device 150 by writing the user data in the memory blocks. Data processing by the controller 130 may include generating and updating user data corresponding to the command operation and metadata for the memory blocks. Data processing by the controller 130 may include storing the generated and updated metadata in the memory blocks of the memory device 150 by writing the generated and updated metadata.

The metadata may include information about the memory blocks of the memory device. The metadata may include information about the memory blocks where the user data corresponding to a specific received command are stored or are to be stored. The metadata may include map data about the memory blocks where the user data corresponding to a received command are stored or are to be stored. In an embodiment, the meta data may include first and second map data about the memory blocks of the memory device. For example, the metadata may include first map data having logical to physical (L2P) information (hereinafter referred to as "logical information") and second map data having physical to logical (P2L) information (hereinafter referred to as "physical information").

The metadata may include information about, the user data corresponding to a command received from the host 102. The metadata may include information about the command operation corresponding to the received command.

In an embodiment, the metadata may include at least one of information about the user data corresponding to a command received from the host 102, information about the command operation corresponding to the received command, information about the memory blocks of the memory device information about the memory blocks of the memory device corresponding to the command operation, information about the map data of the memory blocks of the memory device, information about the map data of the memory blocks corresponding the command operation. Hence, various embodiments may be envisioned by those skilled in the relevant art to which this invention pertains wherein the metadata may include any combination of the aforementioned pieces of information.

In operation, for example, when a write command is received from the host 102, the controller 130 may store user data corresponding to the received write command in memory blocks of the memory device 150 by writing the user data in the memory blocks. The memory blocks where the user data is stored pursuant to the received write command may be open or free memory blocks.

In an embodiment, metadata may include first map data and second map data. The first map data may include an L2P map table in which mapping information (i.e., logical information) between logical addresses and physical addresses for the user data stored in the memory blocks has been written. The second map data may include a P2L map table in which mapping information (i.e., physical information) between physical addresses and logical addresses for the memory blocks in which the user data has been stored has been written. The controller 130 may store the metadata in memory blocks (e.g., open memory blocks or free memory blocks) of the memory device 150 by writing the metadata in the memory blocks.

In particular, when a write command is received from the host 102, the controller 130 may store user data corresponding to the write command in memory blocks by writing the user data in the memory blocks. The controller 130 may also store metadata including first map data and second map data for the user data stored in the memory blocks, in the memory blocks. The data segments of the user data and the meta segments of the metadata may be stored in the memory blocks of the memory device 150.

In an embodiment, the memory device 150 may include a plurality of memory dies. Each of the memory dies may include a plurality of planes. Each of the planes may include a plurality of memory blocks. The user data and the metadata of a command operation corresponding to a command received from the host 102 may be programmed and stored in the memory blocks of the memory device. For example, the user data and the metadata may be stored in a super memory block by writing them through a one shot program.

The super memory block may include a plurality of memory blocks. For example, the super memory block may include a first memory block and a second memory block. The first memory block may be a specific memory bloc k included in a first plane of a first memory die of the plurality of memory dies, whereas the second memory block may be a specific memory block different from the specific memory block included in the first plane of the first memory die. For example, the second memory block may be a specific memory block included in a second plane of the first memory die. Or, for example, the second memory block may be a specific memory block included in any of the plurality of planes of the second memory die of the plurality of memory dies. The second memory block may be a different memory block from the first memory block, hence, it may be included in the same memory die and plane of the first memory block, or in a different plane in the same memory die as that of the first memory block, or in a memory die different from the memory die of the first memory block.

In an embodiment, user data and metadata are programmed into a super memory block including a plurality of memory blocks, for example, two memory blocks included in the memory device 150 and are updated. The super block may include more than two memory blocks. The memory blocks of the super memory block may include memory blocks included in the same plane of the same memory die, memory blocks included in different planes of the same memory die, or memory blocks included in different memory dies, as described above.

In an embodiment, data segments of user data an meta segments of metadata may be stored in a super memory block including a first memory block and a second memory block by writing the data segments an d the meta segments in the super memory block. Storing of the user data and the updating and storing of the meta segments of the metadata corresponding to the stored user data may be performed by taking into consideration at least one parameter (or information) included in a command received from the host 102. The meta segments may be the map segments of metadata. The map segments of the metadata may include the first map segments of first map data and the second map segments of second map data.

For example, a parameter for updating the metadata may be or a parameter (or information) included in a command received from the host 102. Or a parameter for updating the metadata may be determined by taking into consideration a parameter (or information) included in a command received from the host 102. The parameter may include, for example, one of a command operation corresponding to the command, or a processing pattern of user data (e.g., read/program/write pattern of the user data), or a data type (e.g., random, sequential, or locality) of the user data.

Hence, in operation, according to an embodiment, metadata may be updated according to an update parameter and stored in memory blocks of the memory device 150. The update parameter is determined by taking into consideration a command parameter such as a processing pattern or data type of a command received from the host 102. Accordingly, the first map segments, i.e., the L2P segments) of first map data may be updated end stored based on the update parameter. The second map segments, i.e., the P2L segments of the second map data may be updated according to the storage of user data in memory blocks of the memory device 150. For example, the second map segments may be updated according to the storage of the user data in a super memory block through one shot program. The updated P2L segments and L2P segments may then be stored in the memory blocks of the memory device 150. For example, metadata including the updated P2L segments and L2P segments may be stored in the super memory block through one shot program.

In an embodiment, the update of the meta segments of the metadata may be buffered based on the update parameter determined according to the command parameter received from the host 102. In particular the update of the first map segments of the first map data may be buffered based on the update parameter. While the update of the first map segments is buffered an operation for storing the user data may be performed. The user data may be stored in a super memory block through one shot program. After the buffering of the meta segments (e.g., the first map segments) corresponding to an update parameter, the meta segments may be updated and an operation for storing the metadata may then be performed. The metadata may be stored in a super memory block through one shot program.

Data program performance, may be improved by programming user data during the buffering of meta segments. Also user data and meta data may be stored in a super memory block including a plurality of memory blocks through one shot program, further improving data processing performance.

In an embodiment, data segments and meta segments of the user data, in particular, map segments may be stored in an interleaving way. Accordingly, access performance for map data may be improved through the interleaving of map segments in the memory device 150.

Hereinafter, in an embodiment, when a command operation corresponding to a command received from the host 102 is performed in the memory system, the data segments of user data and the meta segments of metadata for the command operation are written and stored in a plurality of pages included in a super memory block of the memory device 150 through one shot program. Furthermore, when a command operation corresponding to a command received from the host 102 is performed, the map segments of map data included in metadata (i.e., the L2P segments of first map data and the P2L segments of second map data) are updated according to a command operation (e.g., the program of user data). The updated L2P segments and P2L segments may be written and stored in a super memory block through one s hot program in the memory system. A data processing operation in the memory system will be described in more detail below with reference to FIGS. 12 to 14.

Referring to FIG. 12, the controller 130 stores data corresponding to a command (e.g., user data corresponding to a write command) received from the host 102 in open, blocks super memory blocks included in the memory device 150. For example, the memory device 150 includes a first, second and third super memory blocks 1250, 1260, and 1270. Each of the super memory blocks includes two open memory blocks, however, this is only an example, and it is noted that each super block may include two or more memory blocks. Also the number of super memory blocks may change by design. The first super memory block 1250 includes two open blocks 1252 and 1254. The second super memory block 1260 includes two open blocks 1262 and 1264. The third super memory block 1270 includes two open blocks 1272 and 1274. The controller 130 stores user data corresponding to the write command received from the host 102 in open blocks 1252, 1254, 1262, 1264, 1272, and 1274 of the super memory blocks 1250, 1260 and 1270 by writing the data in the open blocks 1252, 1254, 1262, 1264, 1272, and 1274. Furthermore, the controller 130 stores map data for the user data in the open blocks 1252, 1254, 1262, 1264, 1272, and 1274 of the first super memory block 1250, second super memory block 1260, and third super memory block 1270 of the memory device 150 by writing the map data in the open blocks 1252, 1254, 1262, 1264, 1272, and 1274 according to the write operation of the user data.

In an embodiment, the memory device 150 may include a plurality of memory dies. Each of the memory dies may include a plurality of planes and each of the planes may include a plurality of memory blocks. Each of the super memory blocks (i.e., the first, second and third super memory blocks 1250, 1260 and 1270) may include a plurality of memory blocks (e.g., a first memory block and a second memory block included in the plurality of memory dies and plurality of planes of the memory device 150). In this case, each of the super memory blocks 1250, 1260, and 1270 of the memory device 150 may include a plurality of memory blocks greater than the two memory blocks (i.e., the first memory block and the second memory block). In an embodiment, each of the super memory blocks 1250, 1260, and 1270 of the memory device 150 is assumed to include two memory blocks (i.e., a first memory block and a second memory block), for convenience of description.

Accordingly, the first super memory block 1250 includes a block0 1252 as the first memory block and a block1 1254 as the second memory block. The second super memory block 1260 includes a block2 1262 as the first memory block and a block3 1264 as the second memory block. The third super memory block 1270 includes a block0 1272 as the first memory block and a block1 1274 as the second memory block. Furthermore, if the first memory blocks (i.e., the block0 1252, the block2 1262, and the block4 1272) respectively included in the first, second and third super memory blocks 1250, 1260 and 1270 are specific memory blocks included in the first plane of the first memory die of the memory dies of the memory device 150, the second memory blocks (i.e., the block1 1254, the block3 1264, and the block5 1274) respectively included in the first second and third super memory blocks 1250, 1260 and 1270 may be specific memory blocks different from the specific memory blocks included in the first plane of the first memory die of the memory device 150, specific memory block included in the second plane of the first memory die of the memory device 150, or specific memory blocks included in the planes of the second memory die of the memory device 150.

The first memory block and second memory block included in each of the first, second and third super memory blocks 1250, 1260 and 1270 may be memory blocks included in the same plane of the same memory die, memory blocks included in different planes of the same memory die, or memory blocks included in different memory dies. Hereinafter, for convenience of description, the first memory blocks (i.e., the block0 1252, the block2 1262, and the block4 1272) respectively included in the first second and third super memory blocks 1250, 1260 and 1270 are memory blocks included in the first plane of the first memory die of the memory device 150. Also, the second memory blocks (i.e., the block1 1254, the block3 1264, and the block5 1274) respectively included in the first, second and third super memory blocks 1250, 1260 and 1270 are memory blocks included in the second plane of the first memory die of the memory device 150.

Furthermore the controller 130 stores user data and metadata according to a command operation corresponding to a command received from the host 102 in a plurality of memory blocks of the memory device 150 by writing the user data and the metadata. For example, the controller 130 stores user data and metadata according to a command operation corresponding to a command received from the host 102 in super memory blocks (i.e., the first, second and third super memory blocks 1250, 1260 and 1270), each including the first memory block and the second memory block, by writing the user data and the metadata through one shot program.

The controller 130 stores in formation e.g., first map data and second map data), indicating that user data is stored in the pages of the first memory blocks and the second memory blocks included in the super memory blocks 1250, 1260, and 1270 of the memory device 150, in first memory blocks and second memory blocks included in a plurality of memory blocks (e.g., the super memory blocks 1250, 1260, and 1270) included in the memory device 150 through one shot program by performing a command operation corresponding to a command received from the host 102. In other words, the controller 130 stores the logical segments (i.e., L2P segments) of the first map data and the physical segments (i.e., P2L segments) of the second map data in the first and second memory blocks of the super memory blocks 1250, 1260, and 1270 through one shot program.

Furthermore the controller 130 includes a first and second buffers 1210 and 1220 included in the memory 144 of the controller 130. The controller 130 caches and buffers data corresponding to the command received from the host 102 (e.g., user data corresponding to a write command) in the first buffer 1210. That is the controller 130 stores the data segments 1212 of the user data in the first buffer 1210 as a data buffer/cache. Also the controller 130 stores the data segments 1212 stored in the first buffer 1210 in a plurality of memory blocks included in the memory device 150. For example, the controller 130 stores the data segments 1212 stored in the first buffer 1210, in pages included in the first and second memory blocks of the super memory blocks 1250, 1260, and 1270 included in the memory device 150 by writing the data segments 1212 in the pages through one shot program.

Furthermore, when the data segments 1212 of the user data corresponding to the command received from the host 102 are written and stored in the pages included in the first and second memory blocks of the super memory blocks 1250, 1260 and 1270 the controller 130 generates first map data and second map data and stores the first map data and the second map data in a second buffer 1220 included in the memory 144 of the controller 130. That is, the controller 130 stores the L2P segments 1222 of the first map data and the P2L segments 1224 of the second map data for the user data in the second buffer 1220 as a map buffer/cache (i.e., a meta buffer/cache).

That is, the controller 130 stores metadata for the user data corresponding to the command received from the host 102 and the command operation in the second buffer 1220 of the controller 130. In an embodiment, the metadata stored in the second buffer 1220 of the controller 130 includes information about the command data (e.g., command data information) corresponding to the command received from the host 102, information about the command operation (e.g., command operation information) corresponding to the command, information about memory blocks (e.g., memory block information) of the memory device 150 for which the command operation is performed, and map data (e.g., first map data and second map data) corresponding to the command operation. The controller 130 may store map data in the second buffer 1220 as metadata. For example, the controller 130 may store map segments in the second buffer 1220 as meta segments.

Furthermore, the controller 130 stores the L2P segments 1222 of the first map data and the P2L segments 1224 of the second map data, stored in the second buffer 1220, in a plurality of memory blocks included in the memory device 150. In an embodiment, the controller 130 stores the L2P segments 1222 of the first map data and the P2L segments 1224 of the second map data in pages included in the first and second memory blocks of the super memory blocks 1250, 1260, and 1270 through one shot program.

In an embodiment, the controller 130 performs an update and storage on the map segments of the first map data and the second map data by taking into consideration a parameter of a command, received from the host 102 in response to the storage of user data in the pages of the first and second memory blocks of the super memory blocks 1250, 1260, and 1270 of the memory device 150. In other words, the controller 130 determines an update parameter for the map segments by taking into consideration the command parameter. For example, the command parameter includes a processing pattern of a command operation or user data or a data type of the user data. Furthermore, the controller 130 updates the map segments based on the update parameter, and stores the updated map segments in the super memory blocks 1250, 1260, and 1270 of the memory device 150.

In particular, the controller 130 determines an update parameter by taking into consideration a parameter (i.e., processing pattern or data type) of a command received from the host 102 and updates and stores the first map segments (i.e., the L2P segments 1222) of the first map data based on the update parameter. In other words the controller 130 updates the second map segments (i.e., the P2L segments 1224) of the second map data, stored in the second buffer 1220, in response to the storage of user data. Furthermore, the controller 130 updates the first map segments (i.e., the L2P segments 1222) of the first map data stored in the second b offer 1220 according to the update parameter determined based on the command parameter. Then the controller 130 stores the updated P2L segments 1224 and L2P segments 1222 in a plurality of memory blocks included in the memory device 150. For example, the controller 130 stores metadata, including the updated P2L segments 1224 and L2P segments 1222, in the super memory blocks 1250, 1260, and 1270 through one shot program.

In an embodiment the controller 130 buffers the update of the meta segments of the metadata based on the update parameter determined according to a parameter of the received command. In particular, the controller 130 buffers the update of the first map segments (i.e., the L2P segments 1222) of the first map data in the second buffer 1222 based on the update parameter. While the update of the L2P segments 1222 is buffered, the controller 130 performs an operation for storing user data. The controller 130 stores the data segments 1212 of the user data in the super memory blocks 1250, 1260, and 1270 through one shot program. Furthermore, while the update of the L2P segments 1222 is buffered, the controller 130 updates the second map segments (i.e., the P2L segments 1224) of the second ma data, stored in the second buffer 1222, in the super memory blocks 1250, 1260, and 1270 in response to the storage of the data segments 1212. Furthermore after the update of meta segments (i.e., the L2P segments 1222) is buffered in the second buffer 1222 based on the update parameter, the controller 130 updates the L2P segments 1222 and stores the meta segments of metadata including the updated L2P segments 1222 and P2L segments 1224, in a plurality of memory blocks (e.g., the super memory blocks 1250, 1260, and 1270) included in the memory device 150 through one shot program.

Hereinafter, for convenience of description, an example in which after user data and metadata for a command operation corresponding to a command received from the host 102 are stored in a buffer or cache included in the memory 144 of the controller 130, the user data stored in the first buffer 1210 an d the metadata stored in the second buffer 1220 are stored in the first super memory block 1250 of the memory device 150 through a one shot program will be described with reference to FIG. 13. In other words, after the user data is stored in the first buffer 1210 and the metadata (i.e., first map data and second map data) is stored in the second buffer 1220 the user data stored in the first buffer 1210 and the metadata stored in the second buffer 1220 are stored in the first super memory block 1250 of the memory device 1150 through one shot program.

FIG. 13, illustrates an example in which the user data stored in the first buffer 1210 and the metadata stored in the second buffer 1220 are stored in the same super memory block (i.e., the first super memory block 1250) through one shot program. However, we note that, in another embodiment, user data stored in the first buffer 1210 and metadata stored in the second buffer 1220 may be stored in different super memory blocks. For example, the user data stored in the first buffer 1210 may be stored in the first super memory block 1250, and the metadata stored in the second buffer 1220 may be stored in the second super memory block 1260. Furthermore, the user data stored in the first buffer 1210 may be stored in a plurality of memory blocks of the memory device 150 through one shot program and the metadata stored in the second buffer 1220 may be stored in one memory block or a plurality of memory blocks included in the memory device 150.

Referring now to FIG. 13, like the memory device 150 shown in FIG. 12, the memory device 150 of FIG. 13 also includes a first, second and third super memory blocks 1250, 1260, and 1270. Each of the super memory blocks includes a plurality of memory blocks (e.g., two open memory blocks). The first super memory block 1250 includes two open blocks 1252 and 1254. The second super memory block 1260 includes two open blocks 1262 and 1264. The third super memory block 1278 includes two open blocks 1272 and 1274. The controller 130 includes a first and second buffers 1210 and 1220. The first and second buffers 1210 and 1220 may be included in the memory 144 of the controller 130.

In operation, when a command is received from, the host 102, if a command operation corresponding to the received command is to be performed, the controller 130 stores the data segments 1300 of user data corresponding to the command operation in the first buffer 1210.

The data segment 1300 of the user data stored in the first buffer 1210 may include a plurality of data segments, for example data segments 1302 to 1328, as illustrated in FIG. 13. More specifically, as illustrated in FIG. 13, a data segment 1302 has a logical page number0 (hereinafter referred to as a "data segment0") a data segment 1304 has a logical page number1 (hereinafter referred to as a "data segment1"), a data segment 1306 has a logical page number2 (hereinafter referred to as a "data segment2"), a data segment 1308 has a logical page number3 (hereinafter referred to as a "data segment3"), a data segment 1310 has a logical page number4 (hereinafter referred to as a "data segment4"), a data segment 1312 has a logical page number5 (hereinafter referred to as a "data segment5"), a data segment 1314 has a logical page number6 (hereinafter referred to as a "data segment 6") a data segment 1316 has a logical page number7 (hereinafter referred to as a "data segment7"), a data segment 1318 has a logical page number8 (hereinafter referred to as a "data segment8"), a data segment 1320 has a logical page number9 (hereinafter referred to as a "data segment9"), a data segment 1322 has a logical page number10 (hereinafter referred to as a "data segment10") a data segment 1324 has a logical page number13 (hereinafter referred to as a "data segment11"), a data segment 1326 has a logical page number12 (hereinafter referred to as a "data segment12") a data segment 1328 has a logical page number13 (hereinafter referred to as a "data segment13").

Furthermore, when a command is received from the host 102, if a command operation corresponding to the received command is to be performed, the controller 130 stores the meta segments of metadata for the command operation in the second buffer 1220. For example, the controller 130 stores the meta segments 1330 of metadata including map data for user data in the second buffer 1220 included in the memory 144.

The meta segments 1330 of the data stored in the second buffer 1220 include a plurality of data segments 1332 to 1358. For example, a meta segment 1332 has the segment index0 of the metadata (hereinafter referred to as a "meta segment0"). A meta segment 1334 has the segment index1 of the metadata (hereinafter referred to as a "meta segment1"). A meta segment 1336 has the segment index2 of the metadata (hereinafter referred to as a "meta segment2"). A meta segment 133 has the segment index3 of the metadata (hereinafter referred to as a "meta segment3"). A meta segment 1340 has the segment index4 of the metadata (hereinafter referred to as a "meta segment4"). A meta segment 1342 has the segment index5 of the metadata (hereinafter referred to as a "meta segments"). A meta segment 1344 has the segment index6 of the metadata (hereinafter referred to as a "meta segment6"). A meta segment 1346 has the segment index7 of the metadata (hereinafter referred to as a "meta segment7"). A meta segment 1348 has the segment index8 of the metadata (hereinafter referred to as a "meta segment8"). A meta segment 1350 has the segment index9 of the metadata (hereinafter referred to as a "meta segment9"). A meta segment 1352 has the segment index10 of the metadata (hereinafter referred to as a "meta segment10"). A meta segment 135 has the segment index11 of the metadata (hereinafter referred to as a "meta segment11"). A meta segment 1356 has the segment index12 of the metadata (hereinafter referred to as a "meta segment12"). A meta segment 1358 has the segment index13 the metadata (hereinafter referred to as a "meta segment13").

Furthermore, the controller 130 stores the data segments 1300, stored in the first buffer 1210, and the meta segments 1330, stored in the second buffer 1220, in a plurality of memory blocks included in the memory device 150. For example, the controller 130 stores the data segments 1300 stored in the first buffer 1210, and the meta segments 1330, stored in the second buffer 1220, in the first super memory block 1250 among the first super memory block 1250, second super memory block 1260 and third super memory block 1270 of the memory device 150. For example, the controller 130 stores the data segments 1300 and the meta segments 1330 in the first super memory block 1250 through one shot program.

As described above, when the data segments 1300 of user data stored in the first buffer 1210 are stored in the pages of a first memory block and second memory block included in the first super memory block 1250, the controller 130 performs an update and storage on the meta segments 1330 stored in the second buffer 1220 (i.e., the L2P segments 1222 of first map data and the P2L segments 1224 of second map data included in the meta segments 1330) according to a command parameter received from the host 102. In particular, the controller 130 determines an update parameter for map segments by taking into consideration the command parameter. For example, the command parameter may include a processing pattern of a command operation or user data or a data type of the user data. Also, the controller 130 updates the L2P segments 1222 based on the update parameter. After updating the P2L segments 1224 according to the storage of the data segments 1300, the controller 130 stores the meta segments 1330, including the updated L2P segments 1222 and P2L segments 1224, in the pages of a plurality of memory blocks included in the memory device 150 through one shot program. Also the controller 130 stores the meta segments 1330 in the pages of the first memory block and second memory block of the first super memory block 1250.

In an embodiment, the controller 130 may update the meta segments of metadata (i.e., the L2P segments 1222 of first map data) according to a command parameter received from the host 102. Also, the controller 130 may store the updated meta segments in a plurality of memory blocks included in the memory device 150. For example, the controller 130 may store the updated meta segments in the first memory block and second memory block of the first super memory block 1250 of the memory device 150.

Referring to FIG. 14, when a command parameter of a command received from the host 102 is checked (1400) to have a particular value, for example of "1", at a specific point of time t0, the controller 130 determines an update parameter to also have the value of "1" based on the value of the command parameter. Also, the controller 130 stores data segments 1402 (e.g., the data segment0 1302, the data segment1 1304, the data segment2 1306, and the data segment3 1308) of user data, stored in the first buffer 1210, in the first super memory block 1250 by writing the data segments 1402 of the user data through one shot program according to the update parameter being "1". In other words, the controller 130 stores the data segment0 1302, stored in the first buffer 1210, in the page0 of the block0 1252 (i.e., the first memory block of the first super memory block 1250). The controller 130 stores the data segment1 1304, stored in the first buffer 1210, in the page0 of the block1 1254 (i.e., the second memory block of the first super memory block 1250). The controller 130 stores the data segment2 1306, stored in the first buffer 1210, in the page1 of the block0 1252 (i.e., the first memory block of the first super memory block 1250). The controller 130 stores the data segment3 1308 stored in the first buffer 1210, in the page1 of the block1 1254 (i.e., the second memory block of the first super memo rye block 1250).

Furthermore, at a point of time t1, subsequent to the point of time to, according to the update parameter of the controller 130 updates the P2L segments 1224 of second map data and the L2P segments 1222 of first map data in the second buffer 1220 according to the storage of the data segments 1402 at the point of time t0. Also, the controller 130 stores meta segments 1404, including the updated P2L segments 1224 and L2P segments 1222, in the first super memory block 1250 by writing the meta segments 1404 through one shot program. In other words, at the point of time t1, according to the update parameter "1", the controller 30 updates the P2L segments 1224 and the L2P segments 1222 according to the storage of the data segments 1402 at the point of time t0. Then, the controller 131 stores the meta segments 1404 (e.g., the meta segment0 1332, the meta segment1 1334, the meta segment2 1336, and the meta segment3 1338), including the updated P2L segments 1224 and L2P segments 1222, in the first super memory block 1250 by writing the meta segments 1404.

In this case, the controller 130 stores the meta segment0 1332, stored in the second buffer 1220, in the page2 of the block0 1252 (i.e., the first memory block of the first super memory block 1250). The controller 130 stores the meta segment1 1334, stored in the second buffer 1220, in the page2 of the block1 1254 (i.e., the second memory block of the first super memory block 1250). The controller 130 stores the meta segment2 1336, stored in the second buffer 1220, in the page3 of the block0 1252 (i.e., the first memory block of the first super memory block 1250). The controller 130 stores the meta segment3 338 stored in the second buffer 1220, in the page3 of the block1 1254 (i.e., the second memory block of the first super memory block 1250).

Furthermore, at a point of time t2 subsequent to the point of time t1, according to the update parameter of "1", the controller 130 stores the data segments 1406 (e.g., the data segment4 1310, the data segment5 1312, the data segment6 1314, and the data segment7 1316) of the user data, stored in the first buffer 1210, in the first super memory block 1250 by writing the data segments 1406 through one shot program. In other words, the controller 130 stores the data segment4 1310, stored in the first buffer 1210, in the page4 of the block0 1252 (i.e., the first memory block of the first super memory block 1250). The controller 130 stores the data segment5 1312, stored in the first buffer 1210, in the page4 of the block1 1254 (i.e., the second memory block of the first super memory block 1250). The controller 130 stores the data segment6 1314, stored in the first buffer 1210, in the page5 of the block0 1252 (i.e., the first memory block of the first super memory block 1250). The controller 130 stores the data segment7 1316, stored in the first buffer 1210, in the page5 of the block1 1254 (i.e., the second memory block of the first super memory block 1250).

Furthermore at a point of time t3 subsequent to the point of time t2, according to the update parameter of "1", the controller 130 updates the P2L segments 1224 of the second map data and the L2P segments 1222 of the first map data, according to the storage of the data segments 1406 at the point of time t2, in the second buffer 1220. Also, the controller 130 stores meta segments 1408, including the updated P2L segments 1224 and L2P segments 1222, in the first super memory block 1250 by writing the meta segments 1408 through one shot program. In other words, at the point of time t3, according to the update parameter of "1", the controller 130 updates the P2L segments 1224 and the L2P segments 1222 according to the storage of the data segments 1406 at the point of time t2. Then, the controller 130 stores the meta segments 1408 (e.g., the meta segment4 1340, the meta segment5 1342, the meta segment6 1 344, and the meta segment7 1346), including the updated P2L segments 1224 and L2P segments 1222, in the first super memory block 1250 by writing the meta segments 1408 through one shot program.

In this case, the controller 130 stores the meta segment4 1340, stored in the second buffer 1220, in the page6 of the block0 1252 (i.e., the first memory block of the first super memory block 1250). The controller 130 stores the meta segment5 1342, stored in the second buffer 1220, in the page6 of the block1 1254 (i.e., the second memory block of the first super memory block 1250). The controller 130 stores the meta segment6 1344, stored in the second buffer 1220, in the page7 of the block0 1252 (i.e., the first memory block of the first super memory block 1250). The controller 130 stores the meta segment7 1346, stored in the second buffer 1220 in, the page7 of the block1 1254 (i.e., the second memory block of the first super memory block 1250).

Furthermore, at a point of time t4 subsequent to the point of time t3, according to the update parameter of "1", the controller 130 stores the data segments 1410 (e.g., the data segment8 1318, the data segment 9 1320, the data segment10 1322, and the data segment11 1324) of the user data, stored in the first buffer 1210 in the first super memory block 1250 by writing the data segments 1410 through one shot program. In other words, at the point of time t4, the controller 130 stores the data segment8 1318, stored in the first buffer 1210, in the page8 of the block0 1252 (i.e., the first memory block of the first, super memory block 1250). The controller 130 stores the data segment9 1320, stored in the first buffer 1210, in the page8 of the block1 1254 (i.e., the second memory block of the first super memory block 1250). The controller 130 stores the data segment10 1322, stored in the first buffer 1210, in the page9 of the block0 1252 (i.e., the first memory block of the first super memory block 1250). The controller 130 stores the data segment11 1324, stored in the first buffer 1210 in the page9 of the block1 1254 (i.e., the second memory block of the first super memory block 1250).

Furthermore at a point of time t5 subsequent to the point of time t4, according to the update parameter of "1", the controller 130 updates the P2L segments 1224 of the second map data and the L2P segments 1222 of the first map data according to the storage of the data segments 1410 at the point of time t4 in the second buffer 1220. Then, the controller 130 stores meta segments 1412, including the updated P2L segments 1224 and L2P segments 1222, in the first super memory block 1250 by writing the meta segments 1412 through one shot program. In other words, at the point of time t5, according to the update parameter of "1", the controller 130 updates the P2L segments 1224 and the L2P segments 1222 according to the storage of the data segments 1410 at the point of time t4. Then, the controller 130 stores the meta segments 1412 (e.g., the meta segment8 1348, the meta segment9 1350, the meta segment10 1352, and the meta segment11 1354), including the updated P2L segments 1224 and L2P segments 1222, in the first super memory block 1250 by writing the meta segments 1412.

In this case, the controller 130 stores the meta segment8 1348, stored in the second buffer 1220, in the page10 of the block0 1252 (i.e., the first memory block of the first super memory block 1250). The controller 130 stores the meta segment 9 1350, stored in the second buffer 1220, in the page10 of the block1 1254 (i.e., the second memory block of the first super memory block 1250). The controller 130 stores the meta segment10 1352, stored in the second buffer 1220, in the page11 of the block0 1252 (i.e., the first memory block of the first super memory block 1250). The controller 130 stores the meta segment11 1354, stored in the second buffer 1220, in the page11 of the block1 1254 (i.e., the second, memory block of the first super memory block 1250).

Furthermore for data segments 1414 and meta segments 1416, the controller 130 performs the update and storage operation as described above.

When a command parameter of "2" of a command received from the host 102 is checked (1420), the controller 130 determines an update parameter to be "2" based on the parameter of "2" of the command. At a specific point of time t0, according to the update para meter of "2", the controller 130 stores the data segments 1422 (e.g., the data segment0 1302, the data segment1 1304 the data segment2 1306, and the data segment3 1308) of user data, stored in the first buffer 1210 in the first super memory block 1250 by writing the data segments 1422 through one shot program. In other words, the controller 130 stores the data segment0 1302, stored in the first buffer 1210, in the page0 of the block0 1252 (i.e., the first memory block of the first super memory block 1250). The controller 130 stores the data segment1 1304, stored in the first buffer 1210 in the page0 of the block1 1254 (i.e., the second memory block of the first super memory block 1250). The controller 130 stores the data segment2 1306, stored in the first buffer 1210, in the page1 of the block0 1252 (i.e., the first memory block of the first super memory block 1250). The controller 130 stores the data segment3 1308, stored in the first buffer 1210, in the page1 of the block1 1254 (i.e., the second memory block of the first super memory block 1250). In this case, the controller 130 updates the P2L segments 1224 of the second map data according to the storage of the data segments 1422 at the point of time to.

Furthermore, at a point of time t1 subsequent to the point of time t0 according to the update parameter of "2", the controller 130 stores the data segments 1424 (e.g., the data segment4 1310, the data segment5 1312, the data segment6 1314, and the data segment7 1316) of the user data, stored in the first buffer 1210, in the first super memory block 1250 by writing the data segments 1424 through one shot program. In other words, the controller 130 stores the data segment4 1310, stored in the first buffer 1210, in the page2 of the block0 1252 (i the first memory block of the first super memory block 1250). The controller 130 stores the data segment 1312, stored in the first buffer 1210, in the page2 of the block1 1254 (i.e., the second memory block of the first super memory block 1250). The controller 130 stores the data segment6 1314, stored in the first buffer 1210, in the page3 of the block0 1252 (i.e., the first memory block of the first super memory block 1250). The controller 130 stores the data segment7 1316 stored in the first buffer 1210, in the page3 of the block1 1254 (i.e., the second memory block of the first super memory block 1250). In this case, the controller 130 updates the P2L segments 1224 of the second map data according to the storage of the data segments 1424 at the point of time t1.

Furthermore, at a point of time t2 subsequent to the point of time t1, according to the update parameter of "2", the controller 130 updates the L2P segments 1222 of first map data according to the storage of the data segments 1422 and 1424 at the point of time t0 and the point of time t1 in the second buffer 1220. Then, the controller 130 stores meta segments 1426, including the updated P2L segments 1224 and L2P segments 1222, in the first super memory block 1250 by writing the meta segments 1426 through one shot program. In other words, at the point of time t2, according to the update parameter of "2", the controller 130 updates the L2P segments 1222 according to the storage of the data segments 1422 and 1424 at the point of time t0 and the point of time t1. Then, the controller 130 stores the meta segments 1426 (e.g., the meta segment0 1332, the meta segment1 1334, the meta segment 1336, the meta segment3 1338, the meta segment4 1340, the meta segment5 1342, the meta segment6 1344, and the meta segment 7 1346), including the updated P2L segments 1224 and L2P segments 1222, in the first super memory block 1250 by writing the meta segments 1426 through one shot program.

In this case, the controller 130 stores the meta segment0 1332, stored in the second buffer 1220, in the page4 of the block0 1252 (i.e., the first memory block of the first super memory block 1250). The controller 130 stores the meta segment0 1334, stored in the second buffer 1220, in the page4 of the block1 1254 (i.e., the second memory block of the first super memory block 1250). The controller 130 stores the meta segment2 1336, stored in the second buffer 1220, in the page5 of the block0 1252 (i.e., the first memory block of the first super memory block 1250). The controller 130 stores the meta segment3 338 stored in the second buffer 1220, in the page5 of the block1 1254 (i.e., the second memory block of the first super memory block 1250). The controller 130 stores the meta segment4 1340, stored in the second buffer 1220 in the page6 of the block0 1252 (i.e. the first memory block of the first super memory block 1250). The controller 130 stores the meta segments 1342, stored in the second buffer 1220, in the page6 of the block1 1254 (i.e., the second memory block of the first super memory block 1250). The controller 130 stores the meta segment6 1344, stored in the second buffer 1220, in the page7 of the block0 1252 (i.e., the first memory block of the first super memory block 1250). The controller 130 stores the meta segment 1346, stored in the second buffer 1220, in the page7 of the block1 1254 (i.e., the second memory block of the first super memory block 1250).

Furthermore, at a point of time t3 subsequent to the point of time t2, according to the update para meter of "2", the controller 130 stores the data segments 1428 (e.g., the data segment8 1318, the data segment9 1320, the data segment10 1322 and the data segment11 1324) of the user data, stored in the first buffer 1210, the first super memory block 1250 by writing the data segments 1428 through one shot program. In other words, the controller 130 stores the data segment8 1318, stored in the first buffer 1210, in the page6 of the block0 1252 (i.e., the first memory block of the first super memory block 1250). The controller 130 stores the data segment9 1320, stored in the first buffer 1210, in the page6 of the block1 1254 (i.e., the second memory block of the first super memory block 1250). The controller 130 stores the data segment10 1322 stored in the first buffer 1210, in the page7 of the block0 1252 (i.e., the first memory block of the first super memory block 1250). The controller 130 stores the data segment11 1324, stored in the first buffer 1210, in the page7 of the block1 1254 (i.e., the second memory block of the first super memory block 1250). In this case, the controller 130 updates the P2L segments 1224 of the second map data according to the storage of the data segments 1428 at the point of time t3.

Furthermore, at a point of time t4 subsequent to the point of time t3, according to the update parameter of "2", the controller 130 stores the data segments 1430 (e.g., the data segment12 1326, the data segment13 1328, the data segment14, and the data segment15) of the user data, stored in the first buffer 1210, in the first super memory block 1250 by writing the data segments 1430 through one shot program. In other words, the controller 130 stores the data segment12 1326, stored in the first buffer 1210, in the page8 of the block0 1252 (i.e., the first memory block of the first super memory block 1250). The controller 130 stores the data segment13 1328, stored in the first buffer 1210, in the page8 of the block1 1254 (i.e., the second memory block of the first super memory block 1250). The controller 130 stores the data segment14, stored in the first buffer 1210, n the page9 of the block0 1252 (i.e., the first memory block of the first super memory block 1250). The controller 130 stores the data segment15, stored in the first buffer 1210, in the page9 of the block1 1254 (i.e., the second memory block of the first super memory block 1250). In this case, the controller 130 updates the P2L segments 1224 of the second map data according to the storage of the data segments 1430 at the point of time t3.

Furthermore, at a point of time t5 subsequent to the point of time t4, according to the update parameter of "2", the controller 130 updates the L2P segments 1222 of the first map data in the second buffer 1220 according to the storage of the data segments 1428 and 1430 at the point of time t3 and the point of time t4. Then, the controller 130 stores meta segments 1432, including the updated P2L segments 1224 and L2P segments 1222, in the first super memory block 1250 by writing the meta segments 1432 through one shot program. In other words, at the point of time t5, according to the update parameter of "2", the controller 130 updates the L2P segments 1222 according to the storage of the data segments 1428 and 1430 at the point of time t3 and the point of time t4. Then, the controller 130 stores, the meta segments 1432 (e.g., the meta segment8 1348, the meta segment9 1350 the meta segment10 1352, the meta segment11 1354, the meta segment12 1356, the meta segment13 1358, the meta segment14, and the meta segment15), including the updated P2L segments 1224 and L2P segments 1222, in the first super memory block 1250 by writing the meta segments 1432.

In this case, the controller 130 stores the meta segment8 1348, stored in the second buffer 1220, in the page10 of the block0 1252 (i.e., the first memory block of the first super memory block 1250). The controller 130 stores the meta segment9 1350, stored in the second buffer 1220, in the page10 of the block1 1254 (i.e., the second memory block of the first super memory block 1250). The controller 130 sores the meta segment10 1352, stored in the second buffer 1220, in the page11 of the block0 1252 (i.e., the first memory block of the first super memory block 1250). The controller 130 stores meta segment11 1354, stored in the second buffer 1220, in the page11 of the block1 1254 (i.e., the second memory block of the first super memory block 1250). The controller 130 stores the meta segment12 1356, stored in the second buffer 1220, in the page12 of the block0 1252 (i.e., the first memory block of the first super memory block 1250). The controller 130 stores the meta segment13 1358, stored in the second buffer 1220, in the page12 of the block1 1254 (i.e., the second memory block of the first super memory block 1250). The controller 130 stores the meta segment14, stored in the second buffer 1220, in the page13 of the block0 1252 (i.e., the first memory block of the first super memory block 1250). The controller 130 stores the meta segment15, stored in the second buffer 1220, in the page13 of the block1 1254 (i.e., the second memory block of the first super memory block 1250).

When a command parameter of "3" of a command received from the host 102 is checked (1440), the controller 130 determines an update parameter to be "3" based on the parameter of "3" of the command. At a specific point of time t0, according to the update parameter of the controller 130 stores the data segments 1442 (e.g., the data segment0 1302, the data segment1 1304, the data segment2 1306 and the data segment3 1308) of user data, stored in the first buffer 1210, in the first super memory block 1250 by writing the data segments 1442 through one shot program. In other words, the controller 130 stores the data segment0 1302, stored in the first buffer 1210, in the page0 of the block 0 1252 (i.e., the first memory block of the first super memory block 1250). The controller 130 stores the data segment1 1304, stored in the first buffer 1210, in the page0 of the block1 1254 (i.e., the second memory block of the first super memory block 1250). The controller 130 stores the data segment2 1306, stored in the first buffer 1210, in the page1 of the block0 1252 (i.e., the first memory block of the first super memory block 1250). The controller 130 stores the data segment3 1308, stored in the first buffer 1210, in the page1 of the block1 1254 (i.e., the second memory block of the first super memory block 1250). In this case, the controller 130 updates the P2L segments 1224 of the second map data according to the storage of the data segments 1442 at the point of time t0.

Furthermore, at a point of time t1 subsequent to the point of time to, according to the update parameter of "3", the controller 130 stores the data segments 1444 (e.g., the data segment4 1310, the data segment5 1312 the data segment6 1314, and the data segment7 1316) of user data, stored in the first buffer 1210, in the first super memory block 1250 by writing the data segments 1444 through one shot program. In other words, the controller 130 stores the data segment4 1310, stored in the first buffer 1210, in the page2 of the block0 1252 (i.e., the first memory block of the first super memory block 1250). The controller 130 stores the data segment5 1312, stored in the first buffer 1210, in the page2 of the block1 1254 (i.e., the second memory block of the first super memory block 1250). The controller 130 stores the data segment6 1314, stored in the first buffer 1210 in the page3 of the block0 1252 (i.e., the first memory block of the first super memory block 1250). The controller 130 stores the data segment7 1316, stored in the first buffer 1210, in the page3 of the block1 1254 (i.e., the second memory block of the first super memory block 1250). In this case, the controller 130 updates the P2L segments 1224 of the second map data according to the storage of the data segments 1444 at the point of time t1.

Furthermore, at a point of time t2 subsequent to the point of time t1, according to the update parameter of "3", the controller 130 stores the data segments 1446 (e.g., the data segment8 1318, the data segment9 1320 the data segment10 1322, and the data segment11 1324) of the user data, stored in the first buffer 1210, in the first super memory block 1250 by writing the data segments 1446 through one shot program. In other words, the controller 130 stores the data segment 8 1318, stored in the first buffer 1210, in the page4 of the block0 1252 (i.e., the first memory block of the first super memory block 1250). The controller 130 stores the data segment9 1320, stored in the first buffer 1210 in the page4 of the block1 1254 (i.e., the second memory block of the first super memory block 1250). The controller 130 stores the data segment10 1322, stored in the first buffer 1210, in the page5 of the block0 1252 (i.e., the first memory block of the first super memory block 1250). The controller 130 stores the data segment11 1324, stored in the first buffer 1210, in the page5 of the block1 1254 (i.e., the second memory block of the first super memory block 1250). In this case, the controller 130 updates the P2L segments 1224 of the second map data according to the storage of the data segments 1446 at the point of time t2.

Furthermore, at a point of time t3 subsequent to the point of time t2, according to the update para meter of "3" the controller 130 updates the L2P segments 1222 of the first map data in the second buffer 1220 according to the storage of the data segments 1442, 1444, and 1446 at the point of time t0, the point of time t1, and the point of time t2. Then, the controller 130 stores meta segments 1448, including the updated P2L segments 1224 and L2P segments 1222, in the first super memory block 1250 by writing the meta segments 1448 through one shot program. In other words, at the point of time t3, according to the update parameter of "3", the controller 130 updates the L2P segments 1222 according to the storage of the data segments 1442, 1444, and 1446 at the point of time t0, the point of time t1, and the point of time t2. Also the controller 130 stores the meta segments 1448 (e.g., the meta segment0 1332, the meta segment1 1334, the meta segment2 1336, the meta segment3 1338, the meta segment4 1340, the meta segment5 1342, the meta segment6 1344, the meta segment7 1346, the meta segment 8 1348 the meta segment9 1350, the meta segment10 1352, and the meta segment11 1354), including the updated P2L segments 1224 and L2P segments 1222 in the first super memory block 1250 by writing the meta segments 1448.

In this case, the controller 130 stores the meta segment0 1332, stored in the second buffer 1220, in the page6 of the block0 1252 (i.e., the first memory block of the first super memory block 1250). The controller 130 stores the meta segment1 1334, stored in the second buffer 1220, in the page6 of the block1 1254 (i.e., the second memory block of the first super memory block 1250). The controller 130 stores the meta segment2 1336, stored in the second buffer 1220, in the page7 of the block0 1252 (i.e., the first memory block of the first super memory block 1250). The controller 130 stores the meta segment3 1338, stored n the second buffer 1220, in the page7 of the block1 1254 (i.e., the second memory block of the first super memory block 1250). The controller 130 stores the meta segment4 1340, stored in the second buffer 1220, in the page8 of the block0 1252 (i.e., the first memory block of the first super memory block 1250). The controller 130 stores the meta segment5 1342 stored in the second buffer 1220, in the page8 of the block1 1254 (i.e., the second memory block of the first super memory block 1250). The controller 130 stores the meta segment6 1344, stored in the second buffer 1220, in the page9 of the block0 1252 (i.e., the first memory block of the first super memory block 1250). The controller 130 stores the meta segment7 1346, stored in the second buffer 1220, in the page9 of the block1 1254 (i.e., the second memory block of the first super memory block 1250). The controller 130 stores the meta segment8 1348, stored in the second buffer 1220, in the page10 of the block0 1252 the first memory block of the first super memory block 1250). The controller 130 stares the meta segment9 1350, stored in the second buffer 1220, in the page10 of the block1 1254 (i.e., the second memory block of the first super memory block 1250). The controller 130 stores the meta segment10 1352, stored in the second buffer 1220, in the page11 of the block10 1252 (i.e., the first memory block of the first super memory block 1250). The controller 130 stores the meta segment11 1354, stored in the second buffer 1220, in the page11 of the block1 1254 (i.e., the second memory block of the first super memory block 1250).

Furthermore at a point of time t4 subsequent to the point of time t3, according to the update parameter of "3", the controller 130 stores the data segments 1450 (e.g. the data segment12 1326, the data segment13 1328, the data segment14 and the data segment15) of the user data, stored in the first buffer 1210, in the first super memory block 1250 by writing the data segments 1450 through one shot program. In other words, the controller 130 stores, the data segment12 1326, stored in the first buffer 1210, in the page12 of the block0 1252 (i.e., the first memory block of the first super memory block 1250). The controller 130 stores the data segment13 1328, stored in the first buffer 1210, in the page12 of the block1 1254 (i.e., the second memory block of the first super memory block 1250). The controller 130 stores the data segment14, stored in the first buffer 1210, in the page13 of the block0 1252 (i.e., the first memory block of the first super memory block 1250). The controller 130 stores the data segment15 stored in the first buffer 1210, in the page13 of the block1 1254 (i.e., the second memory block of the first super memory block 1250). In this case, the controller 130 updates the P2L segments 1224 of the second map data according to the storage of the data segments 1450 at the point of time t4.

When a command parameter equals "all" of a command received from the host 102 is checked (1460), the controller 130 determines an update parameter to be based on the parameter of "all" of the command. At a specific point of time t0, according to the update parameter of "all" the controller 130 stores all the data segments 1462 of user data, stored in the first buffer 1210, in the first super memory block 1250 by writing the data segments 1462 through one shot program. In other words, the controller 130 stores all the data segments 1300, stored in the first buffer 1210, in a plurality of pages included in the block0 1252 (i.e., the first memory block of the first super memory block 1250) and the block1 1254 (i.e., the second memory block of the first super memory block 1250).

Furthermore at a point of time t1 subsequent to the point of time t0, according to the update parameter of "all", the controller 130 updates all the P2L segments 1224 of the second map data and all the L2P segments 1222 of the first map data in the second buffer 1220 according to the storage of all the data segments 1462 at the point of time t0. Then, the controller 130 stores meta segments 1464 including all the updated P2L segments 1224 and all the updated L2P segments 1222, in the first super memory block 1250 by writing, the meta segments 1464 through one shot program. In other words, at the point of time t1, according to the update parameter of "all", the controller 130 updates all the P2L segments 1224 and all the L2P segments 1222 according to the storage of all the data segments 1452 at the point of time t0. Then, the controller 130 stores the meta segments 1464 (i.e., all the meta segments 1330 stored in the second buffer 1220), including the updated P2L segments 1224 and L2P segments 1222, in the plurality of pages included in the block0 1252 (i.e., the first memory block of the first super memory block 1250) and the block1 1254 (i.e., the second memory block of the first super memory block 1250).

In an embodiment if a command operation corresponding to a command received from the host 102 is performed as described above, user data and metadata corresponding to the command operation are stored in the memory 144 of the controller 130. In other words the data segments 1300 of the user data are stored in the first buffer 1210 as the data buffer/cache included in the memory 144 of the controller 130, and the meta segments 1330 of the metadata are stored in the second buffer 1220 as the meta buffer/cache included in the memory 144 of the controller 130. Furthermore, a command parameter received from the host 102 is checked, and an update parameter is determined. According to the update parameter, the data segments 1300 stored in the first buffer 1210 are stored in a plurality of memory blocks included in the memory device 150. For example, the data segments 1300 stored in the first buffer 1210 are stored in super memory blocks of the memory device 150 through one shot program. Furthermore, according to the update parameter, after the meta segments 1330 (i.e., the L2P segments 1222 of first map data) are updated in the second buffer 1220 the updated meta segments 1330 are stored in the plurality of memory blocks included in the memory device 150. For example the updated meth segments 1330 are stored in the super memory blocks of the memory device 150 through one shot program.

Accordingly, if a command operation corresponding to a command received from the host 102 is to be performed user data and metadata corresponding to the command operation may be processed rapidly and stably through one shot program. As a suit, the command operation may be performed rapidly and stably. Furthermore in the memory system according to an embodiment of the present invention, metadata (i.e., the map data of user data) is stored in the first and second memory blocks of the super memory blocks 1250, 1260, and 1270 of the memory device 150 in an interleaving way (e.g., as shown in FIG. 14) through one shot program. That is, the map data of user data is stored in a plurality of memory blocks of the memory device 150 in an interleaving way. Accordingly, access to metadata for which a command operation will be performed (i.e., access to map data) may be rapidly processed.

Figure 15:
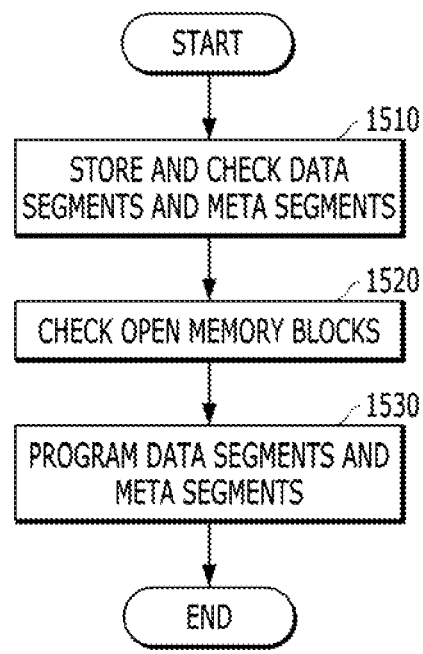
FIG. 15 is a diagram schematically illustrating an operational process for processing data in the memory system according to an embodiment of the present invention.

FIG. 15 diagram schematically illustrating an operational process for processing data in the memory system, according to embodiment of the present invention. For example, the process may be performed by the controller 130 of the memory system 110 in FIGS. 1, 12 and 13.

Referring to FIG. 15, if a command operation corresponding to a command received from the host 102 is to be performed, at step 1510, the memory system 110 stores the data segments of user data and the meta segments of metadata corresponding to the command operation in the memory 144 of the controller 130. Then, the memory system 110 checks the data segments and the meta segments for one shot program from the data segments and the meta segments, stored in the memory 144 of the controller 130, to the super memory blocks of the memory device 150. In this case, the memory system 110 checks a command parameter received from the host 102 and then determines an update parameter based on the command parameter.

Furthermore, at step 1520, the memory system 110 checks open blocks in the super memory blocks of the memory device 150, for the one s hot program for the data segments and the meta segments stored in the memory 144 of the controller 130. For example the open blocks may be the first and second memory blocks of the super memory blocks in the memory device 150.

At step 1530, according to the update parameter, the memory system 110 stores the data segments, stored in the memory 144 of the controller 130 in pages included in the super memory blocks of the memory device 150 by writing (i.e., programming) the data segments through one shot program. Furthermore, according to the update parameter, the memory system 110 updates the meta segments (i.e., the P2L segments of second map data and the L2P segments of first map data) according to the program of the data segments and then stores meta segments, including the updated P2L segments and L2P segments, in the pages included in the super memory blocks of the memory device 150 by writing (i.e., programming) the meta segments through one shot program.

The memory system and the operating method thereof may process data more rapidly and stably than existing memory systems by improving the use efficiency of the m emery device.

Although various embodiments have been described for illustrative purposes be apparent to those skilled in the art that various changes and modifications may be made without departing from the spirit and/or scope of the invention as defined in the following claims.

What is claimed is:

1. A memory system, comprising:
a memory device including a plurality of memory blocks; and
a controller including a memory, the controller being suitable for performing a command operation corresponding to a command received from a host, storing user data and metadata in the memory, and storing the user data and the metadata in at least one memory block among the memory blocks based on a command parameter included in the command,
wherein the memory comprises:
a first buffer suitable for storing data segments of the user data; and
a second buffer suitable for storing meta segments of the metadata,
wherein the controller is suitable for:
determining an update parameter based on the command parameter,
storing the data segments stored in the first buffer in the at least one memory block based on the update parameter,
updating the meta segments in response to the storage of the data segments, and
storing the metadata in the memory by buffering the updated meta segments in the memory based on the update parameter,
wherein the meta segments includes map segments of a first map data and a second map data,
wherein the controller is suitable for updating and buffering the map segments of the first map data based on the update parameter, and
wherein the controller is suitable for updating and buffering the map segments of the second map data in response to the storage of the data segments.

2. The memory system of claim 1, wherein the controller is suitable for storing the data segments stored in the first buffer in the at least one memory block while buffering the updated meta segments in the memory.

3. The memory system of claim 1, wherein:
the controller is suitable for storing the user data and the metadata stored in the memory in a super memory block including at least two memory blocks among the plurality of the memory blocks through one shot program.

4. The memory system of claim 3, wherein the super memory block comprises a first memory block and a second memory block among the plurality of memory blocks,
wherein the memory device comprises a plurality of memory dies, each of the plurality of memory dies including a plurality of planes, each of the plurality of planes including the plurality of memory blocks, and wherein the first memory block comprises a specific memory block of memory blocks included in a first plane of a first memory die of the plurality of memory dies.

5. The memory system of claim 4, wherein the second memory block comprises one of:
   a specific memory block which belongs to the memory blocks included in the first plane of the first memory die of the memory dies and which is different from the specific memory block of the memory blocks included in the first plane of the first memory die of the plurality of memory dies;
   a specific memory block of memory blocks included in a second plane of the first memory die of the memory dies; and
   a specific memory block of memory blocks included in a plurality of planes of a second memory die of the memory dies.

6. The memory system of claim 1, wherein the command parameter includes one of a processing pattern of the user data, and a data type of the user data.

7. An operating method of a memory system, comprising:
   receiving a command from a host with respect to a memory device including a plurality of memory blocks;
   performing a command operation corresponding to the command between a controller of the memory device and the plurality of memory blocks;
   storing user data and metadata in a memory of the controller; and
   storing the user data and the metadata in at least one memory block among the memory blocks based on a command parameter included in the command; and
   wherein the storing of the user data and the metadata in the memory of the controller comprises:
   storing data segments of the user data in a first buffer included in the memory; and
   storing meta segments of the metadata in a second buffer included in the memory; and
   wherein the operating method of a memory system further comprising determining an update parameter based on the command parameter, and
   the storing of the data segments in the memory blocks comprises storing the data segments stored in the first buffer in the at least one memory block based on the update parameter,
   updating the meta segments in response to the storage of the data segments, and
   buffering the updated meta segments in the memory based on the update parameter,
   wherein the meta segments includes map segments of a first map data and a second map data,
   wherein the updating and buffering of the map segments of the first map data is performed based on the information, and
   wherein the updating and buffering of the map segments of the second map data is performed in responsive to the storage of the data segments.

8. The operating method of claim 7, wherein the storing of the data segments stored in the first buffer in the at least one memory block is performed while buffering the updated meta segments in the memory.

9. The operating method of claim 7, wherein:
   the storing of the user data and the metadata in the memory blocks comprises storing the user data and the metadata stored in the memory in a super memory block including at least two memory blocks among the plurality of the memory blocks through one shot program.

10. The operating method of claim 9, wherein the super memory block comprises a first memory block and a second memory block among the plurality of memory blocks,
    wherein the memory device comprises a plurality of memory dies, each of the plurality of memory dies including a plurality of planes, each of the plurality of planes including the plurality of memory blocks, and
    wherein the first memory block comprises a specific memory block of memory blocks included in a first plane of a first memory die of the plurality of memory dies.

11. The operating method of claim 10, wherein the second memory block comprises one of:
    a specific memory block which belongs to the memory blocks included in the first plane of the first memory die of the memory dies and which is different from the specific memory block of the memory blocks included in the first plane of the first memory die of the plurality of memory dies;
    a specific memory block of memory blocks included in a second plane of the first memory die of the memory dies; and
    a specific memory block of memory blocks included in a plurality of planes of a second memory die of the memory dies.

12. The operating method of claim 7, wherein the information includes one of a processing pattern of the user data, and a data type of the user data.

* * * * *